(12) United States Patent
Burge et al.

(10) Patent No.: US 10,697,769 B2
(45) Date of Patent: Jun. 30, 2020

(54) LEVEL WITH METAL FRAME SUPPORTING PROTECTIVE OUTER BODY

(71) Applicant: Milwaukee Electric Tool Corporation, Brookfield, WI (US)

(72) Inventors: Joseph William Burge, Milwaukee, WI (US); Michael John Caelwaerts, Milwaukee, WI (US); Michael Wyatt, Waukesha, WI (US); Bryant Deakins, Kansasville, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/599,644

(22) Filed: Oct. 11, 2019

(65) Prior Publication Data

US 2020/0049502 A1 Feb. 13, 2020

Related U.S. Application Data

(63) Continuation of application No. 15/650,471, filed on Jul. 14, 2017, now Pat. No. 10,520,308, which is a
(Continued)

(51) Int. Cl.
*G01C 9/26* (2006.01)
*A47G 1/16* (2006.01)

(52) U.S. Cl.
CPC . *G01C 9/26* (2013.01); *A47G 1/16* (2013.01)

(58) Field of Classification Search
CPC ........ G01C 15/004; G01C 9/26; G01C 15/00; G01C 9/24; G01C 9/28; G01C 15/002;
(Continued)

(56) References Cited

U.S. PATENT DOCUMENTS 3,835,549 A * 9/1974 De Jong ................. G01C 9/28
33/379
3,889,353 A 6/1975 Provi
(Continued)

FOREIGN PATENT DOCUMENTS

CN 3383117 8/2004
CN 3473415 9/2005
(Continued)

OTHER PUBLICATIONS

International Search Report and Written Opinion for International Application No. PCT/US2017/037061 dated Sep. 11, 2017, 16 pages.
(Continued)

*Primary Examiner* — Yaritza Guadalupe-McCall
(74) *Attorney, Agent, or Firm* — Reinhart Boerner Van Deuren s.c.

(57) ABSTRACT

A tool, such as a level, including one or more polymer/plastic body segment, protective cover and/or seal is provided. The covers discussed herein may limit or prevent dirt or construction materials, such as concrete, from entering into the level body. The cover may also be a non-stick material, such as a polymer outer sleeve, that limits the ability of dirt and construction material to adhere to the level. The level may also include scratch resistant vial windows.

20 Claims, 16 Drawing Sheets

Related U.S. Application Data continuation of application No. PCT/US2017/037061, filed on Jun. 12, 2017.

(60) Provisional application No. 62/354,477, filed on Jun. 24, 2016, provisional application No. 62/408,882, filed on Oct. 17, 2016, provisional application No. 62/455,314, filed on Feb. 6, 2017.

(58) Field of Classification Search
CPC ... G01C 9/06; G01C 9/32; G01C 9/10; G01C 15/008
USPC .......................................... 33/371, 383, 379
See application file for complete search history.

(56) References Cited

U.S. PATENT DOCUMENTS

| | | | |
|---|---|---|---|
| 3,921,306 A | | 11/1975 | Provi |
| 4,407,075 A | * | 10/1983 | MacDermott ............ G01C 9/32 33/348.2 |
| 5,279,041 A | | 1/1994 | Wright |
| 5,406,714 A | | 4/1995 | Baker et al. |
| 6,098,298 A | * | 8/2000 | Burge ...................... G01C 9/26 33/371 |
| 6,675,490 B1 | | 1/2004 | Krehel et al. |
| 6,792,686 B2 | | 9/2004 | Krehel et al. |
| D514,961 S | | 2/2006 | Kim |
| D526,224 S | | 8/2006 | Kim |
| 7,150,107 B2 | | 12/2006 | Kim |
| D563,808 S | | 3/2008 | Schwartz et al. |
| 7,472,486 B2 | | 1/2009 | Tran et al. |
| 7,536,797 B2 | | 5/2009 | Steffens et al. |
| D623,544 S | | 9/2010 | Kim et al. |
| 7,900,366 B2 | | 3/2011 | Spaulding |
| D643,320 S | | 8/2011 | Lewis et al. |
| D644,944 S | | 9/2011 | Kallabis et al. |
| D646,595 S | | 10/2011 | Allemand |
| D686,926 S | | 7/2013 | Moe |
| 8,631,584 B2 | | 1/2014 | Steele et al. |
| 8,661,698 B2 | | 3/2014 | Kallabis |
| 8,914,987 B2 | | 12/2014 | Sanchez et al. |
| D730,207 S | | 5/2015 | Ben Josef et al. |
| D743,281 S | | 11/2015 | Wojciechowski et al. |
| D743,818 S | | 11/2015 | Wojciechowski et al. |
| D750,511 S | | 3/2016 | Wojciechowski et al. |
| D751,428 S | | 3/2016 | Johnson et al. |
| D751,429 S | | 3/2016 | Johnson et al. |
| D751,430 S | | 3/2016 | Johnson et al. |
| D762,129 S | | 7/2016 | Cobb |
| D777,589 S | | 1/2017 | Wojciechowski et al. |
| D796,973 S | | 9/2017 | Wojciechowski |
| D800,585 S | | 10/2017 | Wojciechowski |
| D810,597 S | * | 2/2018 | Burge ............... D10/74 |
| D836,471 S | * | 12/2018 | Wyatt ............... D10/69 |
| 10,520,308 B2 | * | 12/2019 | Burge ............... G01C 9/26 |
| 2005/0229415 A1 | | 10/2005 | Kim |
| 2005/0229416 A1 | | 10/2005 | Kim |
| 2006/0248738 A1 | | 11/2006 | Tran et al. |
| 2011/0265340 A1 | | 11/2011 | Kallabis |
| 2013/0192075 A1 | | 8/2013 | Sanches |
| 2015/0300819 A1 | | 10/2015 | Pelletier et al. |
| 2017/0131098 A1 | | 5/2017 | Yu |
| 2017/0167869 A1 | * | 6/2017 | Burge ............... G01C 9/34 |
| 2017/0328711 A1 | * | 11/2017 | Burge ............... G01C 9/02 |
| 2017/0370716 A1 | * | 12/2017 | Burge ............... G01C 9/26 |
| 2020/0049502 A1 | * | 2/2020 | Burge ............... G01C 9/26 |

FOREIGN PATENT DOCUMENTS

| | | |
|---|---|---|
| CN | 301451232 | 1/2011 |
| CN | 303285776 S | 7/2015 |
| CN | 303317643 | 8/2015 |
| CN | 303876492 | 10/2016 |
| CN | 303886098 | 10/2016 |
| CN | 303886119 | 10/2016 |
| CN | 303946967 | 11/2016 |
| CN | 303946968 | 11/2016 |
| RU | 00095253 | 9/2015 |
| TW | D112217 | 8/2006 |
| TW | D141126 | 6/2011 |
| TW | D148987 | 9/2012 |
| WO | WO2005103615 | 11/2005 |
| WO | WO2017222855 | 12/2017 |

OTHER PUBLICATIONS

Youtube, "Red Stick concrete level", [https://www.youtube.com/watch?v=8UBgA3jpodg], posted Jun. 9, 2017, 1 page.

Milwaukee Tools, "24" Restrick Concrete Level, [https://www.milwaukeetool.com/hand-tools/layout/mlcon24] retrieved Dec. 22, 2017, 1 page.

* cited by examiner

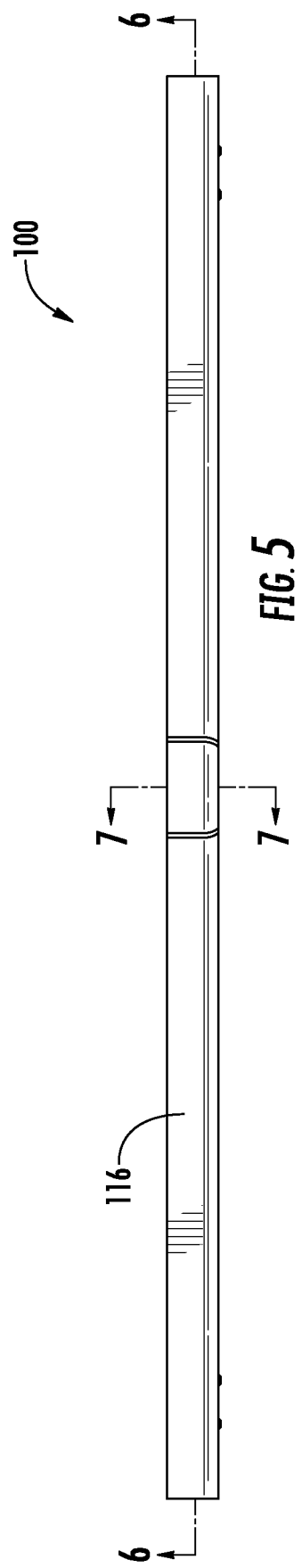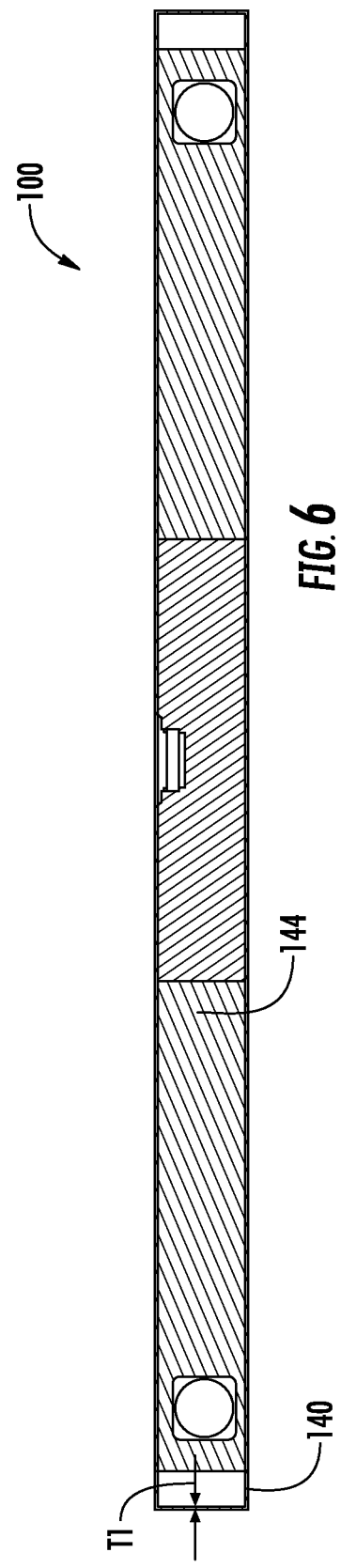

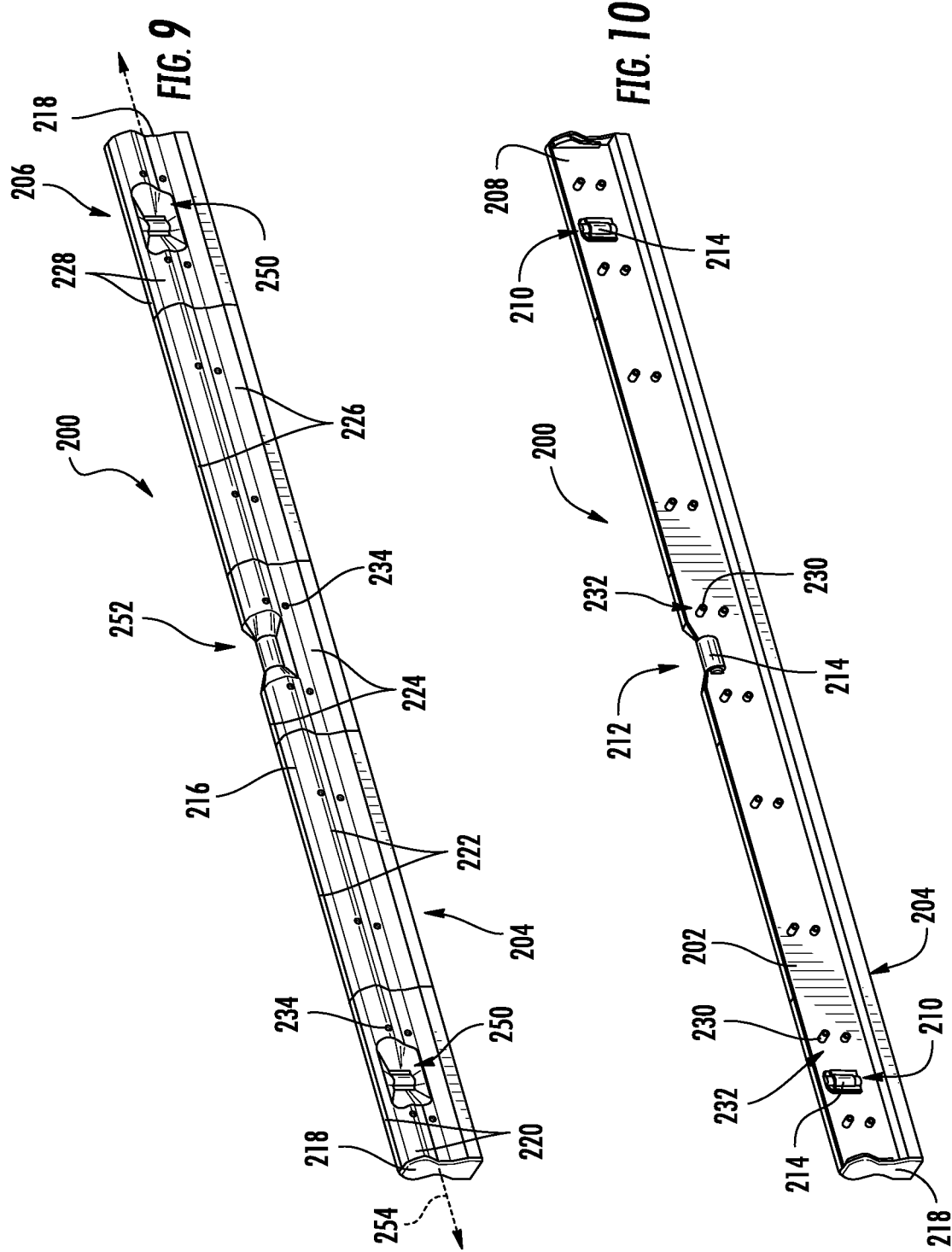

LEVEL WITH METAL FRAME SUPPORTING PROTECTIVE OUTER BODY

CROSS-REFERENCE TO RELATED PATENT APPLICATIONS

The present application is a continuation of U.S. application Ser. No. 15/650,471, filed on Jul. 14, 2017, which is a continuation of International Application No. PCT/US2017/037061, filed on Jun. 12, 2017, which claims the benefit of and priority to U.S. Provisional Application No. 62/354,477, filed on Jun. 24, 2016, U.S. Provisional Application No. 62/408,882, filed on Oct. 17, 2016, and U.S. Provisional Application No. 62/455,314, filed on Feb. 6, 2017, which are incorporated herein by reference in their entireties.

BACKGROUND OF THE INVENTION

The present invention relates generally to the field of tools. The present invention relates specifically to a tool, such as a level or a spirit level, including one or more polymer body element mounted to an internal metal frame, the body element may be in the form of a grip, a protective cover and/or sealing structure. Levels, such as spirit levels, are used to determine the levelness of a structure, surface or workpiece. In use, the level is placed on or in contact with a surface to be measured, and the user views the location of a bubble within a vial relative to markings that indicate the levelness of the structure, surface or workpiece.

SUMMARY OF THE INVENTION

One embodiment of the invention relates to a level including a cover or seal. The level includes a level body having an opening and a level vial located within the opening and supported by the level body. The level includes a window mounted in the opening such that the level vial is viewable through the window. In various embodiments, the level window is formed from a scratch resistant material. In various embodiments, the level body extends between a first end and a second end and defines a hollow central area that extends between the first and second ends, and the level includes a cover, such as an end cap, sealing the level body at one of the first end and second end. The cap blocks entry of material into the hollow area within the level body. In various embodiments, the level includes two end caps, each sealing the open ends of the level body. In various embodiments, the end caps are welded to the level body.

In various embodiments, the window is mounted within at least one opening of the level body in a manner that does not require tools for mounting or removing of the window. In various embodiments, the window is mounted without separate fixation devices such as screws. In some embodiments, a small amount of adhesive may be used for mounting the window. In various embodiments, the window is mounted within the at least one opening via a friction fit arrangement, such as through an interference fit arrangement, a snap fit arrangement, a press-fit arrangement, etc.

Another embodiment of the invention relates to a level including a cover or seal. The level includes an inner level body having an opening and a level vial within the opening. The level includes a level window mounted in the opening. The level includes a cover, such as an outer sleeve surrounding at least a portion of the inner level body such that the outer sleeve defines at least a portion of an outermost surface of the level. In various embodiments, the sleeve is formed from non-stick material, such as a non-stick polymer material, a polymer material, a silicone material, etc. In various embodiments, the outer sleeve is overmolded around the inner level body.

In various embodiments, the outer sleeve covers at least five of six sides of the inner level body. In specific embodiments, the outer sleeve covers all six sides of the inner level body such that a base surface of the level is defined by a portion of the outer surface of the outer sleeve.

In specific embodiments, the outer sleeve covers five of six sides of the inner level body and includes an opening through which a surface of the inner level body is exposed. In some such embodiments, the inner level body is formed from a metal material and defines a lower metal surface that is exposed through the opening in the outer sleeve, and the lower metal surface forms the base surface of the level.

In specific embodiments, the level has a slightly asymmetrical cross-sectional profile taken across the longitudinal axis of the level. In some such embodiments, the cross-section profile includes at least four corners, and one of the four corners is a rounded corner having a radius of curvature larger than a radius of curvature of any of the other three corners. In specific embodiments, the radius of curvature of the rounded corner is at least twice the radius of curvature of any of the other three corners.

Another embodiment of the invention relates to a level including a level frame formed from a metal material. The level frame includes a planar base surface, a vertical wall extending away from the planar base surface, a vial opening defined at least in part within the vertical wall and a longitudinal axis extending between opposing ends of the level frame. The level includes a level vial supported by the level frame within the vial opening and a plastic outer level body coupled to the level frame. The outer level body includes a first pair of plastic body segments coupled to and positioned on opposite sides of the vertical wall of the level frame such that the first pair of plastic body segments defines part of an exterior surface of the level. The outer level body includes a second pair of plastic body segments coupled to and positioned on opposite sides of the vertical wall of the level frame such that the second pair of plastic body segments defines part of the exterior surface of the level.

Another embodiment of the invention relates to a level including a level frame formed from a metal material. The level frame includes a planar base surface, a vertical wall extending away from the planar base surface, a vial opening defined at least in part within the vertical wall and a longitudinal axis extending between opposing ends of the level frame. The level includes a level vial supported by the level frame within the vial opening. The level includes an outer level body coupled to the level frame. The outer level body includes a support section formed from a first plastic material, and the support section engages the level frame such that the outer level body is coupled to the level frame. The outer level body includes a grip section formed from a second plastic material and is coupled to an outer surface of the support section. The grip section defines at least a part of an exterior surface of the level. The second plastic material has a durometer that is less than a durometer of the first plastic material.

Another embodiment of the invention relates to a level including a level frame formed from a metal material. The level frame includes an upper surface, a vertical wall extending downward away from the upper surface and a base structure. The base structure includes a bottom wall defining a planar base surface configured to engage a workpiece. The base structure includes a first sidewall extending upward from a first lateral edge of the bottom wall defining a first corner edge. The base structure includes a second sidewall extending upward from a second lateral edge of the bottom wall defining a second corner edge. The base structure includes a pair of angled sidewalls each extending from one of the first and second sidewalls to a lower end of the vertical wall. A radius of curvature of an outer surface of the first corner edge is at least twice the radius of curvature of an outer surface of the second corner edge. The level frame includes a vial opening defined at least in part within the vertical wall and a longitudinal axis extending between opposing ends of the level frame. The level includes a level vial supported by the level frame within the vial opening.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and together with the description serve to explain principles and operation of the various embodiments.

BRIEF DESCRIPTION OF THE DRAWINGS

FIG. 5 is a top view of the level of FIG. 3, according to an exemplary embodiment.

FIG. 6 is a cross-sectional view taken along line 6-6 shown in FIG. 5, according to an exemplary embodiment.

FIG. 9 is a perspective view of a level, according to another exemplary embodiment.

FIG. 10 is a perspective view of a level frame of the level of FIG. 9, according to an exemplary embodiment.

DETAILED DESCRIPTION

Figure 1:
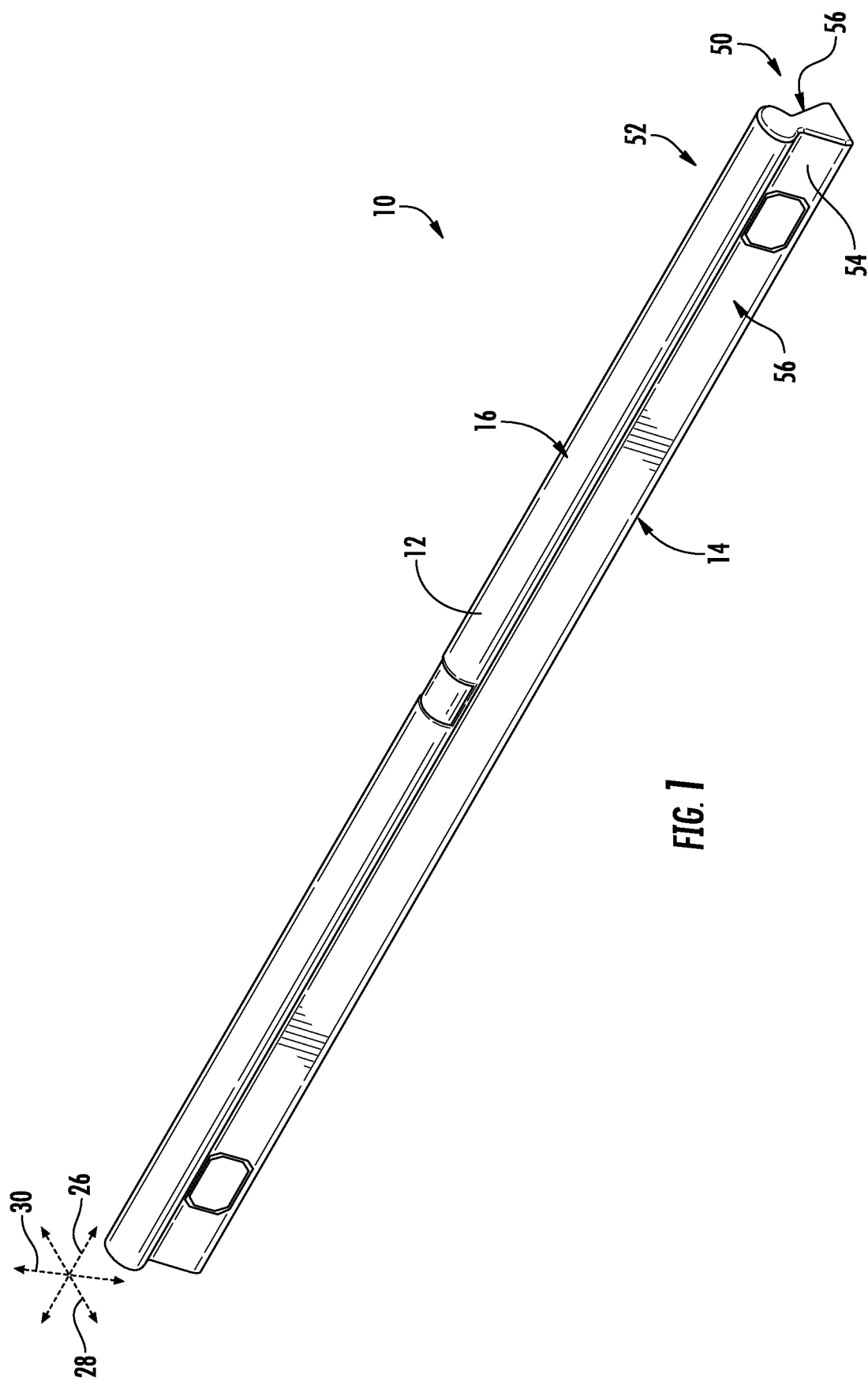
FIG. 1 is a perspective view of a level, according to an exemplary embodiment.

Referring generally to the figures, various embodiments of a level are shown. In general, the levels discussed herein include one or more polymer body structure, cover, sealing structure, or other feature that facilitates use of the level in harsh environments in which material (e.g., concrete, dirt, dust, etc.) may scratch, stick to or enter inside of the body of a conventional level. In various embodiments, level bodies discussed herein are formed from a hollow piece of material, such as a hollow piece of metal material (e.g., a hollow piece of extruded aluminum), and in such embodiments, the level body includes end caps welded or otherwise sealed to the opposing ends of the hollow level body. By sealing the ends of the hollow level body, the end caps limit or prevent migration of material (e.g., concrete) into the hollow central area within the level body. Applicant has found that by utilizing sealed end caps, the useable lifespan of a level may be increased by preventing a building material, such as concrete, from entering the hollow level body, because once solidified, building materials, such as concrete, may be very difficult to remove from a hollow level body.

Further, the levels discussed herein may utilize one or more vial window design which improves use of the level. In various embodiments, the vial window of the level embodiments discussed herein is formed from a scratch resistant (e.g., a high Rockwell hardness plastic material). In various embodiments, some levels (e.g., levels used with concrete) are used as scribing/scraping tools, and scratch resistant components, scratch-resistant windows in particular, improve the life span of the level. In specific embodiments, the vial windows of the level discussed herein are mounted using an arrangement that allows for removal and mounting of the vial window without use of a tool. In such embodiments, a friction fit, interference fit arrangement, a snap-fit, a post and hole arrangement, mounting tangs, etc. may be used to mount the vial window within the level body such that the vial window can be replaced easily by the user of the level without the need for specialized replacement tools or complicated replacement kits. In some embodiments, a small amount of adhesive may be used to help hold the window within the level body.

In various embodiments, the level embodiments discussed herein may include an outer sleeve or cover layer of a polymer layer (e.g., a silicone or other relatively low durometer material) covering an inner level body, frame or skeleton. In such embodiments, the polymer material of the cover layer is selected to limit or prevent building materials (e.g., concrete) from adhering to the outer surface of the level. In various embodiments, the cover layer covers all six major surfaces of the inner level body. In other embodiments, the cover layer covers five of six sides of the inner level body, and in such embodiments, the cover layer is not located on the lower base surface of the level body. Thus, in such embodiments, the exposed metal of the frame provides a highly flat, machined, base surface that may be placed in contact with the workpiece surface to be leveled during use.

In addition, various embodiments of the level discussed herein may have a slightly asymmetrical cross-sectional profile taken across the longitudinal axis of the level. Specifically, in such embodiments, the level includes at least one rounded (e.g., large radius of curvature) longitudinal edge and three substantially non-rounded edges (e.g., a corner, small radius of curvature edge, etc.). In such embodiments, the rounded edge may facilitate gripping/holding of the level, while the sharp corner may be used to scrape or spread a building material, such as concrete.

Referring to FIG. 1, a leveling device, such as level 10, is shown according to an exemplary embodiment. In general, level 10 includes a body 12 that includes a base surface 14 and an opposing top surface 16. Base surface 14 is a flat, planar surface that engages a surface of a workpiece to be measured using level 10. In some specific embodiments, base surface 14 is machined to have a flat, flush or planar surface following formation of body 12 (e.g., following extrusion of a metal forming body 12), and in some embodiments, this machined surface may be anodized.

Figure 2:
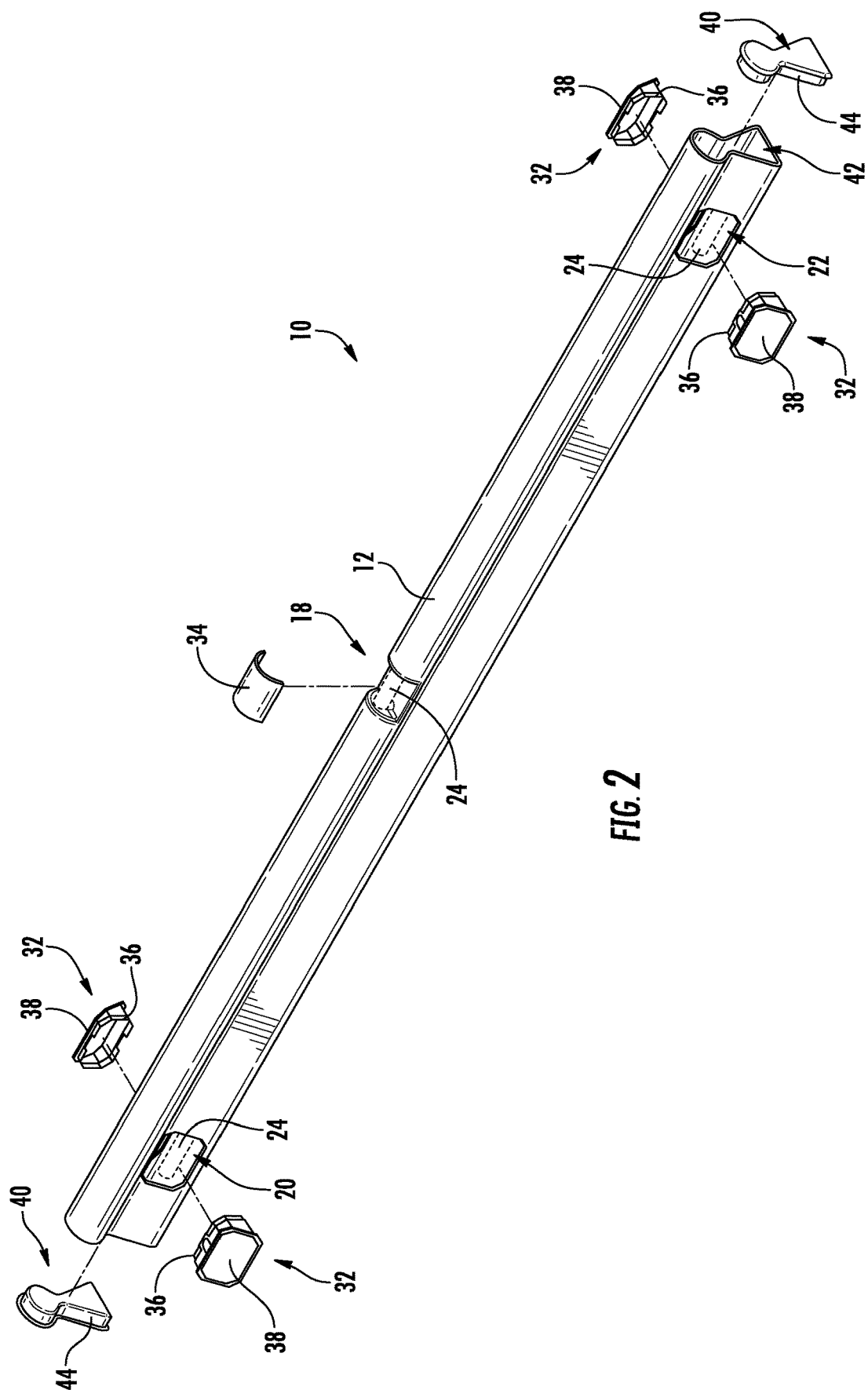
FIG. 2 is an exploded view of the level of FIG. 1, according to an exemplary embodiment.

Referring to FIG. 1 and FIG. 2, level 10 includes a plurality of bores formed in body 12. As shown in FIG. 2, level 10 includes a central opening 18, a first end opening 20 and a second end opening 22. As will be understood, openings 18, 20 and 22 receive three level vials 24 (e.g., bubble vials) which are held in the appropriate orientation relative to base surface 14 in order for the vials to indicate the angle, levelness, degree of plumb, etc. of the corresponding surface of a workpiece, as needed for a particular level design or level type.

As shown in FIG. 1, body 12 of level 10 generally defines a longitudinal axis 26, a width axis 28 and a height axis 30. Surfaces 14 and 16 have a length extending generally in the direction of longitudinal axis 26, and surface 14 resides in a plane parallel to a plane defined by axes 26 and 28. As shown in FIG. 2, openings 20 and 22 each define an axis extending between the left and right sides of level 10 in the direction of width axis 28 such that openings 20 and 22 are substantially perpendicular to longitudinal axis 26.

Referring to FIG. 2, level 10 includes a plurality of vial windows, shown as end windows 32 and a central window 34. In general, windows 32 are mounted within level body 12 at openings 20 and 22 and provide protection to level vials 24 within openings 20 and 22, and window 34 is mounted within level body 12 at central opening 18 to provide protection to level vial 24 within opening 18.

In general, windows 32 and 34 are formed from a hard, scratch resistant, transparent/translucent material to both protect the level vials within level body 12 and to allow the user to easily view the level vial through the window. In various embodiments, windows 32 and 34 are formed from one or more durable, scratch resistant materials which resist scratching during use in a construction environment. In various embodiments, windows 32 and 34 are formed from a hard plastic material, such as high density polyethylene, or a hard, strengthened glass material, such as tempered soda lime glass, sapphire lens, an alkali-aluminosilicate glass material, such as Gorilla Glass, etc.

In various embodiments, windows 32 and 34 and openings 18, 20 and 22 are configured to allow a user to replace the windows 32 and 34 by hand (e.g., without requiring the use of tools, etc.). In various embodiments, windows 32 and 34 are retained within openings 18, 20 and 22 without use of separate fastening components (e.g., screws, bolts, etc.), and in such embodiments, windows 32 and 34 and openings 18, 20 and 22 may be shaped and/or sized to form a friction-based fit to hold windows 32 and 34 in place within level body 12. For example, as shown in FIG. 2, windows 32 each include a sealing flange 36 which extends in a perpendicular direction away from the front pane 38 of each window 32. In this arrangement, the outer surface of sealing flange 36 is substantially parallel to the inner surface of level body 12 that defines openings 20 and 22, and sealing flange 36 is sized to form a friction fit, specifically an interference fit, with this inner surface of level body 12.

In other embodiments, windows 32 and 34 and openings 18, 20 and 22 may have other friction fit arrangements to hold windows in place. For example, windows 32 and/or 34 may include friction fit posts or tangs received within corresponding receiving holes within openings 18, 20 and/or 22. In other embodiments, windows 32 and/or 34 may include a variety of other friction fit arrangements, such as snap-fit arrangements.

Referring to FIG. 2, level 10 includes one or more cover or seal structure, shown as end caps 40, that seal the ends of level body 12, such that material (e.g., dirt, dust, cement, etc.) is blocked from entering into level body 12. As shown in FIG. 2, body 12 of level 10 is a hollow structure defining a hollow central area 42, and in specific embodiments, body 12 of level 10 is an extruded metal tubular structure, such as an extruded aluminum structure, defining hollow central area 42.

In general, end caps 40 are coupled to the ends of level body 12 such that entrances to hollow central area 42 are sealed preventing material from entering hollow central area 42. In various embodiments, end caps 40 are welded to level body 12 in place over the open ends of hollow central area 42, and as shown in the specific embodiment in FIG. 2, each end cap 40 includes wall 44 that has an outer surface sized and shaped to seal against the inner surface of level body 12. In specific embodiments, wall 44 is sized to form an interference fit with the inner surface of level body 12, and this interference fit in combination with welding of end cap 40 to level body 12 provides a robust seal that limits or prevents material from entering level body 12.

Referring back to FIG. 1, level body 12 has a cross-sectional shape transverse to axis 26 that facilitates use and handling of level 10 in various applications. In particular, level 10 includes a generally trapezoidal shaped lower portion 50 and a rounded upper portion 52. Lower portion 50 defines base surface 14 and a pair of opposing, longitudinally extending side surfaces 54 and 56. Side surfaces 54 and 56 are planar surfaces and are angled inward such that the width of the lower portion 50 of the level body decreases as the distance from base surface 14 increases. At the upper ends of side surfaces 54 and 56, a minimum width is reached, and lower body portion 50 transitions into rounded upper portion 52. Thus, in such embodiments, upper surface 16 has a curved, and specifically a semi-circular, cross-sectional shape relative to longitudinal axis 26, and the leftmost and rightmost portion of upper surface 16 transitions into the uppermost portions of side surfaces 54 and 56. In various embodiments, rounded upper portion 52 provides an easy to use gripping surface. Further, the substantially planar surfaces 54 and 56 are flat surfaces the edges of which are useful for scraping, and base surface 14 is a flat, planar surface for contact with a workpiece surface during level measurement.

Referring to FIGS. 3-8, a leveling device, such as level 100, is shown according to an exemplary embodiment. In general, level 100 is substantially the same as level 10 except for the differences as discussed herein. Level 100 includes a body 112 that includes a base surface 114 and an opposing top surface 116. Base surface 114 is a flat, planar surface that engages a surface of a workpiece to be measured using level 100. In some specific embodiments, base surface 114 is machined to have a flat, flush or planar surface, and in some embodiments, this machined surfaced may be anodized. Similar to level 10, level 100 includes a plurality of through bores formed through body 112 that each support a level vial (e.g., level vial 24 shown in FIG. 2), and each level vial is held in the appropriate orientation relative to base surface 114 in order for the vials to indicate the angel, levelness, degree of plumb, etc. of the corresponding surface of a workpiece, as needed for a particular level design.

Figure 3:
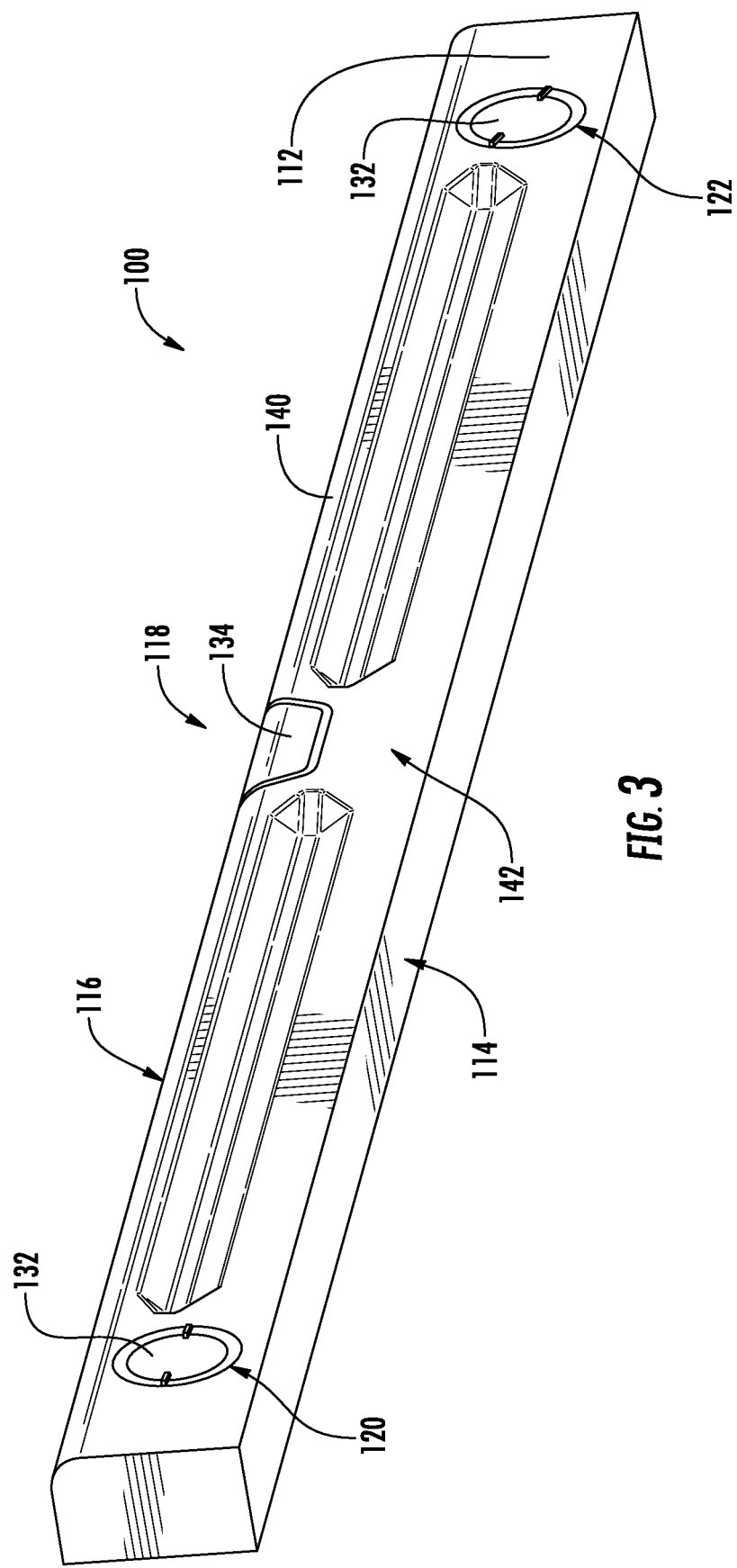
FIG. 3 is a perspective view of a level, according to another exemplary embodiment.

Referring to FIG. 3, level 100 includes a plurality of vial windows, shown as end windows 132 and central window 134. In general, windows 132 are mounted within level body 112 such that openings 120 and 122 are covered, and windows 132 provide protection to level vials within openings 120 and 122, and window 134 is mounted within level body 112 at central opening 118 to provide protection to level vial within opening 118. In various embodiments, windows 132 and 134 are attached within openings 118, 120 and 122 via a friction fit, interference fit or other attachment mechanism that permits removal and replacement of the windows without the use of tools and/or are formed from a scratch resistant material, as discussed above regarding level 10.

Figure 4:
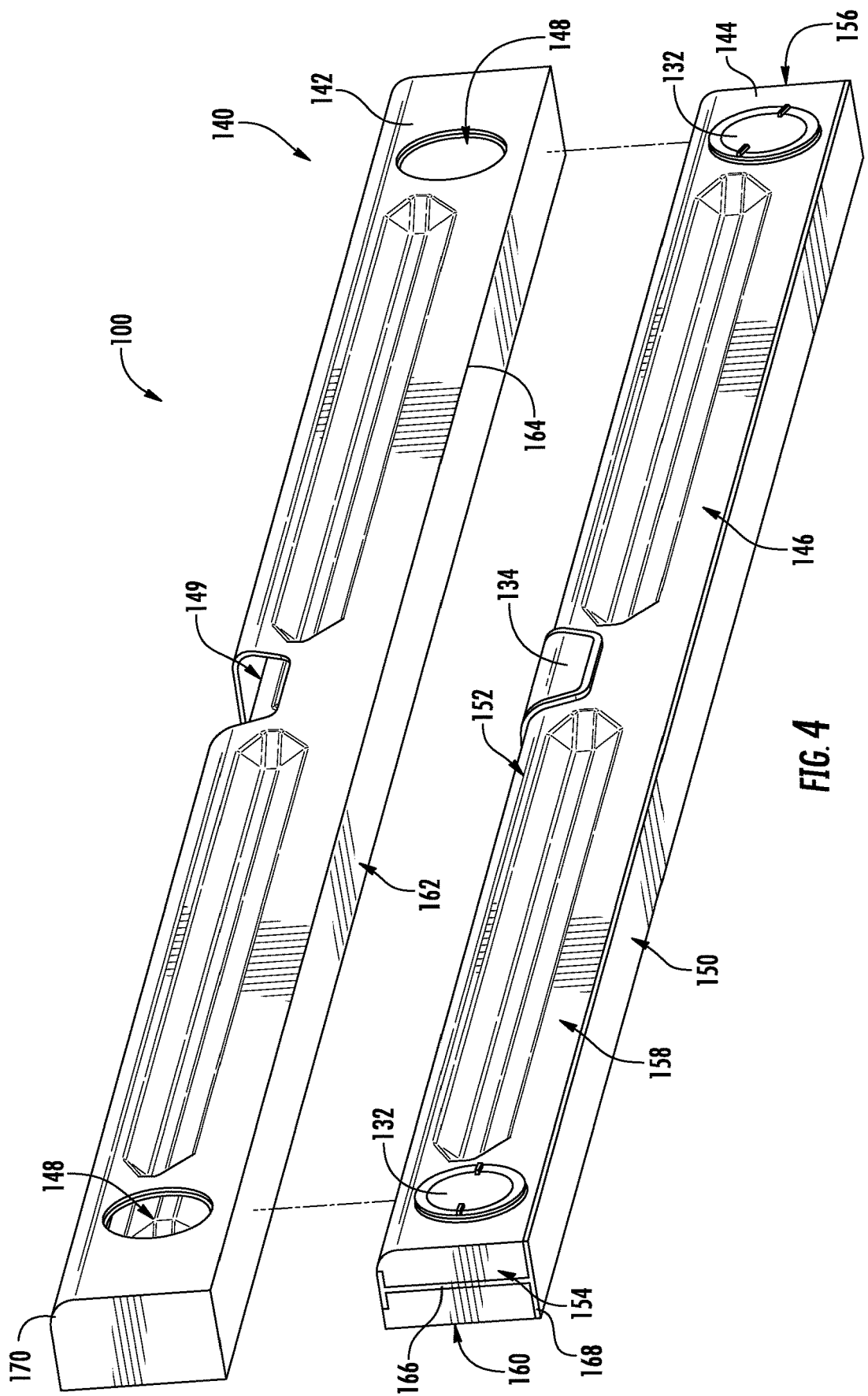
FIG. 4 is an exploded view of the level of FIG. 3, according to an exemplary embodiment.

Referring to FIG. 4, an exploded view of level 100 is shown according to an exemplary embodiment. As shown in FIG. 4, level body 112 includes an outer protective cover, shown as sleeve 140. In general, sleeve 140 is mounted, coupled or attached to inner level body 144 such that the inner surface of sleeve 140 interfaces or directly contacts outer surface 146 of inner level body 144. In this arrangement, sleeve 140 is a protective outer covering including an outer surface 142, and with sleeve 140 mounted to the inner level body 144, outer surface 142 of sleeve 140 provides the outer most surface of level body 112.

Sleeve 140 has a plurality of openings 148 and 149 that are sized to match the width of the outer perimeter of windows 132 and 134, respectively, such that the level vials remain viewable through windows 132 and 134 even after sleeve 140 has been applied to inner level body 144. In addition, in various embodiments, the thickness of sleeve 140 is such that the outer surfaces of windows 132 and 134 is even with outer surface 142 of sleeve 140. In specific embodiments, the thickness of sleeve 140 is substantially the same (e.g., within 1%) as the distance that windows 132 and 134 protrude from inner level body 144. Thus, as shown in FIG. 3, this sizing provides that the windows 132 and 134 are substantially flush with outer surface 142 of sleeve 140 after sleeve 140 is coupled to inner level body 144

In various embodiments, sleeve 140 is formed from a protective material and provides an additional layer of protection to level 100. In various embodiments, sleeve 140 is formed from a polymer material with anti-stick properties on outer surface 142 that limits the ability of dirt, dust, concrete and/or other construction materials to adhere to the outer surface of level 100. In various embodiments, the material of sleeve 140 has one or more properties, such as low friction, low porosity, high hydrophobicity, etc., which may limit the ability of material to adhere to the outer surface of sleeve 140. In a specific embodiment, sleeve 140 is made from a silicone material. In various embodiments, sleeve 140 is a contiguous, integral single piece of polymer material covering inner level body 144, and in specific embodiments, sleeve 140 is overmolded around inner level body 144.

In various embodiments, referring to FIG. 4, sleeve 140 covers at least five of the six major sides of inner level body 144 (e.g., lower surface 150, upper surface 152, end surfaces 154, 156 and side surfaces 158, 160). In such embodiments, the outer surface of sleeve 140 is located over or exterior to at least five of the six sides of inner level body 144 and defines the outermost surface of level 100 at those sides.

In one specific embodiment, sleeve 140 includes a lower region 162 that is a solid wall of polymer material. In this embodiment, the solid wall at lower region 162 is located outside of and adjacent to lower surface 150 of inner level body 144 such that lower surface 150 is covered by sleeve 140. As will be understood, in such embodiments, all six sides of inner level body 144 are covered by sleeve 140, and in such embodiments, the solid wall located at lower region 162 of sleeve 140 defines the base surface 114 of the level 100.

In another embodiment, lower region 162 of sleeve 140 is an open area or hole bounded by lower edge 164 of the four generally vertical sidewalls of sleeve 140. In this embodiment, sleeve 140 only covers five of the six sides of inner level body 144 leaving lower surface 150 exposed. In this embodiment, lower surface 150 of inner level body 144 defines the outermost lower surface of level 100 and as such defines base surface 114.

In a specific embodiment, inner level body 144 includes an I-beam shaped frame 166 that supports the various components of level 100, and in this embodiment, the lower flange 168 of frame 166 defines outer surface 150. In some such embodiments, sleeve 140 with open lower region 162 is molded over the I-beam shaped frame such that lower flange 168 is exposed through the open lower region 162 of sleeve 140. Thus, in such embodiments, sleeve 140 with open lower region 162 allows for a rugged, flat metal surface (e.g., outer surface of lower flange 168) to act as base surface 114 of level 100, while the rest of sleeve 140 provides a protective and nonstick coating to the other five sides of inner level body 144. In some such embodiments, it is believed that providing a level protected by sleeve 140 while still utilizing a metal surface (such as a machined metal surface) to act as leveling base surface 114 provides both protection and non-stick provided by sleeve 140 while providing the accurate leveling provided by a highly level, metal base surface 114. In other embodiments, inner level body 144 may be a box frame instead of an I-beam shaped frame.

Figure 7:
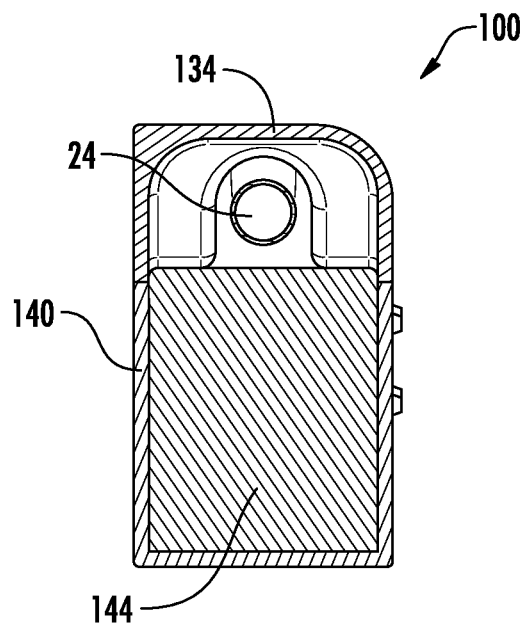
FIG. 7 is a cross-sectional view taken along line 7-7 shown in FIG. 5, according to an exemplary embodiment.

In various embodiments, sleeve 140 is formed over inner level body 144 via an overmolding process. Applicant believes that, by utilizing an overmolding process to form sleeve 140, a thin polymer structure can be formed over inner level body 144 even though level body has an asymmetrical cross-sectional shape (see FIG. 7 and FIG. 8). Further, Applicant believes that overmolding processes may be particularly well suited to forming a robust, yet thin and contiguous polymer sleeve 140. As shown in FIGS. 5-7, sleeve 140 has a low thickness, T1, relative to the overall width and length of level 100. In various embodiments, T1 is less than ¼ inch, specifically less than or equal to $\frac{1}{100}$ inch and more specifically is less than or equal to $\frac{1}{1000}$ inch. In addition, in the embodiment shown in FIGS. 6 and 7, sleeve 140 is a substantially contiguous integral and uninterrupted piece of molded polymer material, surrounding the sides of inner level body 144 as discussed herein.

Figure 8:
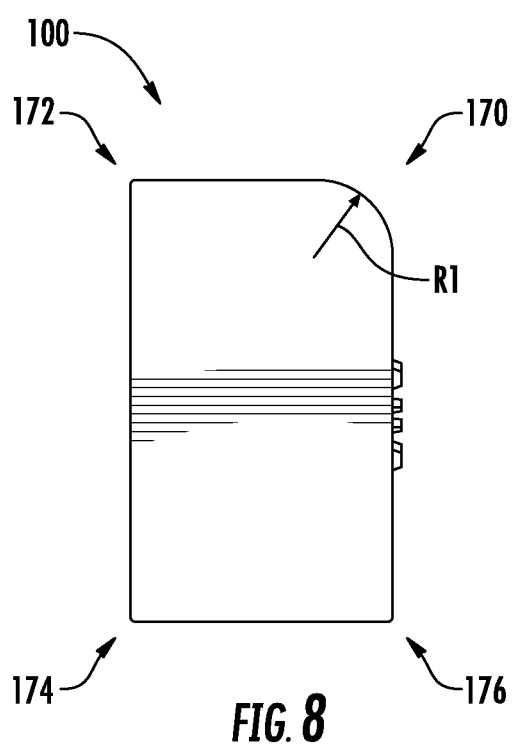
FIG. 8 is an end view of the level of FIG. 3, according to an exemplary embodiment.

Referring to FIG. 8, the end profile shape of level 100 is shown according to an exemplary embodiment. As shown, in FIG. 8, level 100 has a slightly nonsymmetrical end profile, and specifically, level 100 is shaped to have at least one rounded corner, shown as rounded corner 170. In contrast to the other corners 172, 174 and 176 of level 100, corner 170 has a relatively large radius of curvature, R1, and in various embodiments, R1 is at least twice, at least 5 times, at least 100× the radius of curvature defining one or more of corners 172, 174 and/or 176 of level 100. In various embodiments, rounded corner 170 provides an easily gripped surface, while sharper corners 172, 174 and 176 provide scribing and/or scraping edges to level 100. In particular embodiments, rounded corner 170 improves gripping of level 100 while the low radius corners 172, 174 and/or 176 provide sharper edges that may be used to spread concrete. In specific embodiments, Applicant believes that the asymmetrical shape of level 100 is achievable using the overmolding process discussed herein, while such a shape may be difficult or impossible to form using an extrusion method of the sort commonly used in level manufacturing.

Referring to FIGS. 9 and 10, a level 200 is shown according to an exemplary embodiment. Level 200 includes an inner frame 202. In general, frame 202 is a metal frame that supports various components of level 200 discussed herein. Similar to the levels discussed above, frame 202 defines a planar base surface, shown as flat, base surface 204, that is configured to be placed in contact with a workpiece during level/plumbness measurements. In specific embodiments, level 200 is a concrete level and includes a base structure configured for a variety of uses, such as scribing, scraping, etc.

In various embodiments, frame 202 is formed from a metal material, and specifically is formed from an extruded metal material. In a specific embodiment, frame 202 is formed from a magnesium material and in particular an extruded magnesium material. In some such embodiments, level frame 202 is formed from a single, integral and/or continuous piece of metal material, such as magnesium material. In specific embodiments, frame 202 is formed from an extruded magnesium metal alloy material. In general, Applicant believes that use of magnesium materials for frame 202 provides for improved non-stick properties (e.g., relative to extruded aluminum) which allows frame 202 to remain relatively debris free even during use in messy or dirty environments/uses, such as concrete leveling uses. In some such embodiments, as discussed herein, the magnesium frame 202 is used in conjunction with polymer body portions to provide a level with an outer surface that acts as a release surface allowing for easy removal of material, dirt, debris, such as concrete, that may tend to adhere to conventional level bodies. However, in other embodiments, frame 202 may be formed from an extruded aluminum material.

Level 200 includes an outer level body, shown as outer body 206, surrounding and coupled to a vertical wall, shown as central wall 208 of frame 202. As will be explained in more detail below, central wall 208 is a substantially flat (e.g., having planar major surfaces), vertical wall that is extends away from and/or is positioned perpendicular to base surface 204 to which outer body 206 is coupled. Level frame 202 includes one or more vial opening defined at least in part within central wall 208. In the specific embodiment shown in FIG. 10, level 200 includes a plurality of openings 210 formed through central wall 208 located near outer ends of frame 202 and a central notch 212. A level vial 214 is supported in each opening 210, and a third level vial 214 is supported within notch 212. This support is provided via engagement between the surfaces of frame 202 that defines openings 210 or notch 212 and outer surfaces of level vials 214.

In general, outer body 206 is formed from one or more plastic (e.g., molded thermoplastic, molded silicone, etc.) material that is mounted to frame 202 to provide a variety of functions discussed herein. Applicant has found that the plastic material(s) for outer body 206 can be selected to provide both a release surface to facilitate debris removal and at the same time provide improved griping surfaces. In general, outer body 206 is shaped to include an upper, enlarged gripping section 216 and to provide additional support and protection to level vials 214. Level 200 includes a pair of end cap structures 218 that are coupled to the ends of outer body 206 and frame 202. End cap structures 218 plug the outer ends of level 200 and limit/prevent material, debris, dirt, dust, etc. from entering into level 200.

In the embodiment shown, outer body 206 is formed from a plurality of sections or segments, each formed from a pair of opposing body sections that are located on opposing sides of central wall 208. In this arrangement, the body segments define a portion of the exterior surface of level 200. Specifically, outer body 206 includes a first pair of body sections 220, a second pair of body sections 222, a third pair of body sections 224, a fourth pair of body sections 226, and fifth pair of body sections 228. As shown best in FIG. 10, body sections 220, 222, 224, 226 and 228 include screw-receiving posts 230, each of which extend through a post receiving hole 232 in frame wall 208. To couple body sections 220, 222, 224, 226 and 228 to frame 202, posts 230 of each body segment pass through a corresponding post-receiving hole 232, and a screw or other fastener is passed through a corresponding screw hole 234 on the outer surface of each body segment 220, 222, 224, 226 and 228 to tightly couple body sections to frame 202.

In various embodiments, the multiple sections of outer body 206 allows the user of level 200 to replace individual sections of outer body 206 as may be needed. In addition, Applicant believes that multiple sections improve the ability to assemble outer body 206 on to frame 202 by reducing complexity of aligning posts 230 with post-receiving holes 232 (as compared to aligning a single, long plastic component). Further, multiple sections allows for each body section to be molded and mounted to frame 202 with a very high level of positional tolerance, which in turn facilitates the accurate positioning of level vials 214 via body segments as discussed below. In specific embodiments, the pairs of opposing body segments are formed from a plastic material, and in such embodiments, a substantial portion of the exterior surface of level 200 is a plastic surface defined by the plastic material of the body segments. In a specific embodiment, at least 50%, and more specifically at least 75% of the exterior surface of level 200 is defined by the plastic material of outer body 206. Similarly, as can be seen in FIG. 9, outer body 206 extends substantially the entire length of level frame 202, and in specific embodiments, the longitudinal length of outer body 206 is at least 90% and specifically is 99% of the longitudinal length of the level frame 202. In addition, outer body 206 extends a portion of the height of level frame 202, and in specific embodiments, the height of outer body 206 is at least 50% and specifically is 70% of the longitudinal length of the level frame 202. Applicant believes that a level, such as the levels discussed herein, that has a relatively large portion of the outer surface defined by a plastic material, particularly a non-stick plastic material, results in a level with improved durability and/or cleanability as compared to levels having outer body surfaces defined primarily by metal material.

Figure 11:
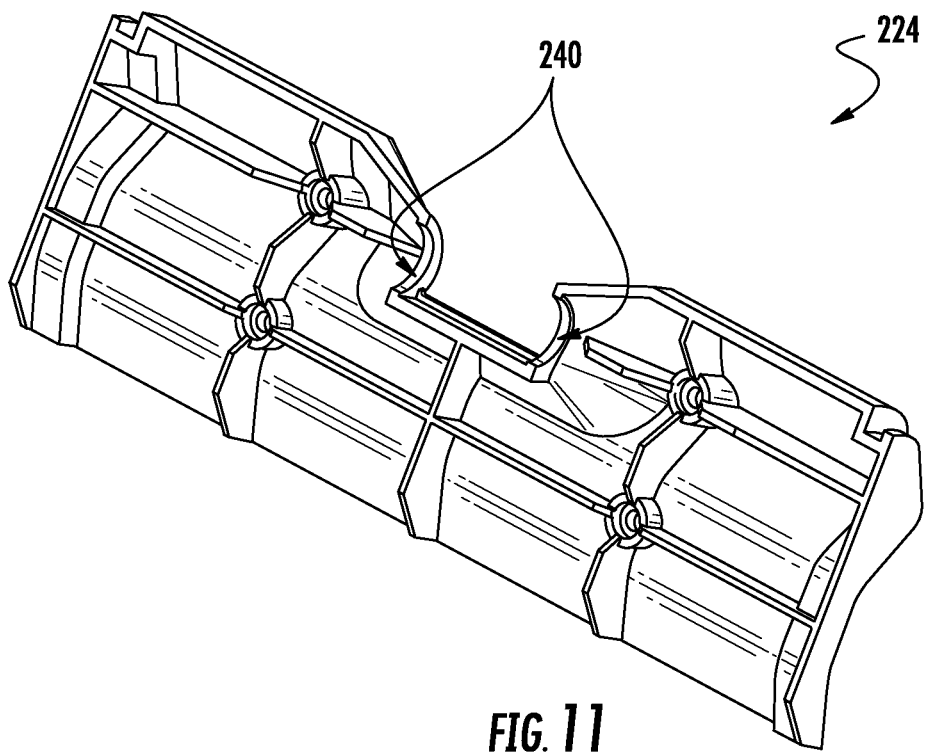
FIG. 11 is a rear perspective view of a body segment of the level of FIG. 9, according to an exemplary embodiment.

Referring to FIG. 11, the inner surface of body segment 224 is shown. Body segment 224 includes a pair of curved surfaces, shown as pair of vertically-orientated semi-cylindrical surfaces 240. Vertically-orientated semi-cylindrical surfaces 240 are curved to match the curvature of an outer surface of level vial 214 and are positioned at a high level (e.g., at least 99% aligned, 99.9% aligned, 99.99% aligned, etc.) of horizontal alignment with each other. In various embodiments, the highly horizontal positioning is achieved via tight/high tolerances in the formation of openings 210 and notch 212. During assembly of level 200, as the pair of opposing body segments 224 are fastened onto frame 202, engagement between opposing surfaces 240 and level vial 214 provides a final, small amount of positioning to level vial 214 to ensure that the level vial is held in the proper horizontal position relative to base surface 204. This engagement provides for proper vial positioning simply by coupling body segment 224 to frame 202 as opposed to level designs that require precise vial fitting operations to ensure that level vials are level/plumb. In other embodiments, each vial 214 is manually set within the plastic body sections which allows for high resolution and setting to high levels of parallelism or perpendicularity relative to the working surface.

Figure 12:
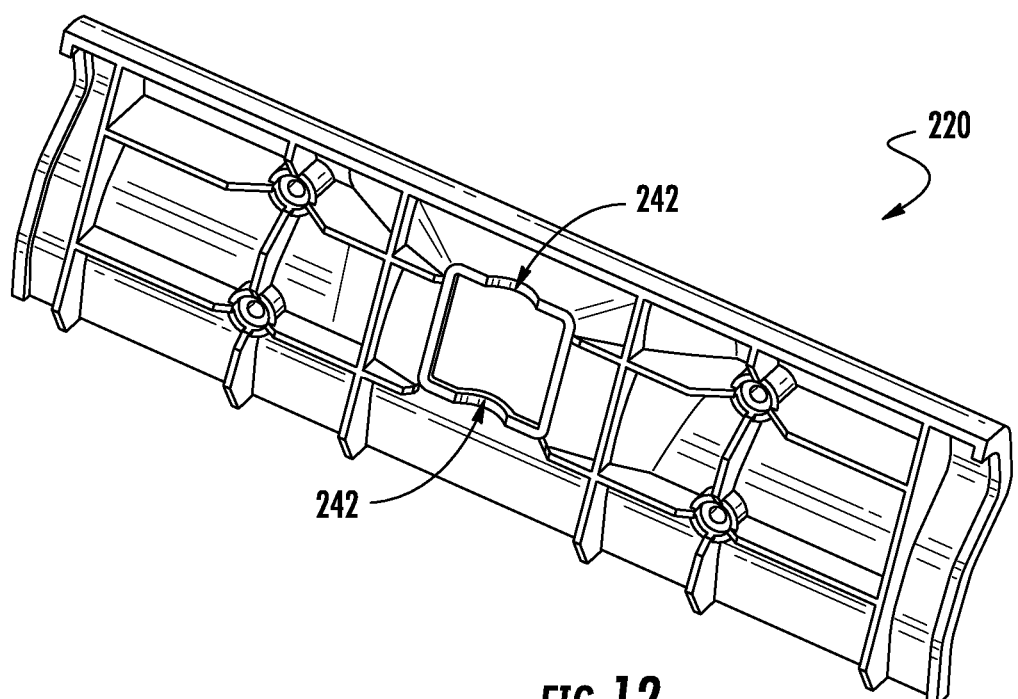
FIG. 12 is a rear perspective view of another body segment of the level of FIG. 9, according to an exemplary embodiment.

Referring to FIG. 12, inner surface of body section 220 is shown according to an exemplary embodiment. It should be noted that body sections 228 are substantially the same as body section 220 discussed herein, but body sections 228 are mirror images of body sections 220. Similar to body segment 224 discussed above, body segment 220 includes a pair of curved surfaces, shown as a pair of horizontally orientated semi-cylindrical surfaces 242. Horizontally orientated semi-cylindrical surfaces 242 are curved to match the curvature of an outer surface of level vial 214 and are positioned at a high level (e.g., at least 99% aligned, 99.9% aligned, 99.99% aligned, etc.) of vertical alignment with each other. During assembly of level 200, as the pair of opposing body segments 220 (and body segments 228) are fastened onto frame 202, engagement between opposing surfaces 242 and level vial 214 provides a final, small amount of positioning to level vial 214 to ensure that the level vial is held in the proper vertical position.

Referring back to FIG. 9, the outer surfaces of body segments 220, 228 and 224 include angled or tapered recessed surface sections 250 and 252, respectively, located around or adjacent to level vials 214. In general, recess surface sections 250 and 252 are angled or tapered inward toward level vials 214, the medial axis of level 200 and/or toward central wall 208. This taper results in a shape to the outer surface of body segments 220/228 and 224 that eliminates sharp corners and deep narrow recesses around level vials 214. This shaping increases the viewing angle of level vials 214 within outer body 206, and also limits the ability of debris, dirt, dust, etc. to collect within the space around level vials 214.

Figure 13:
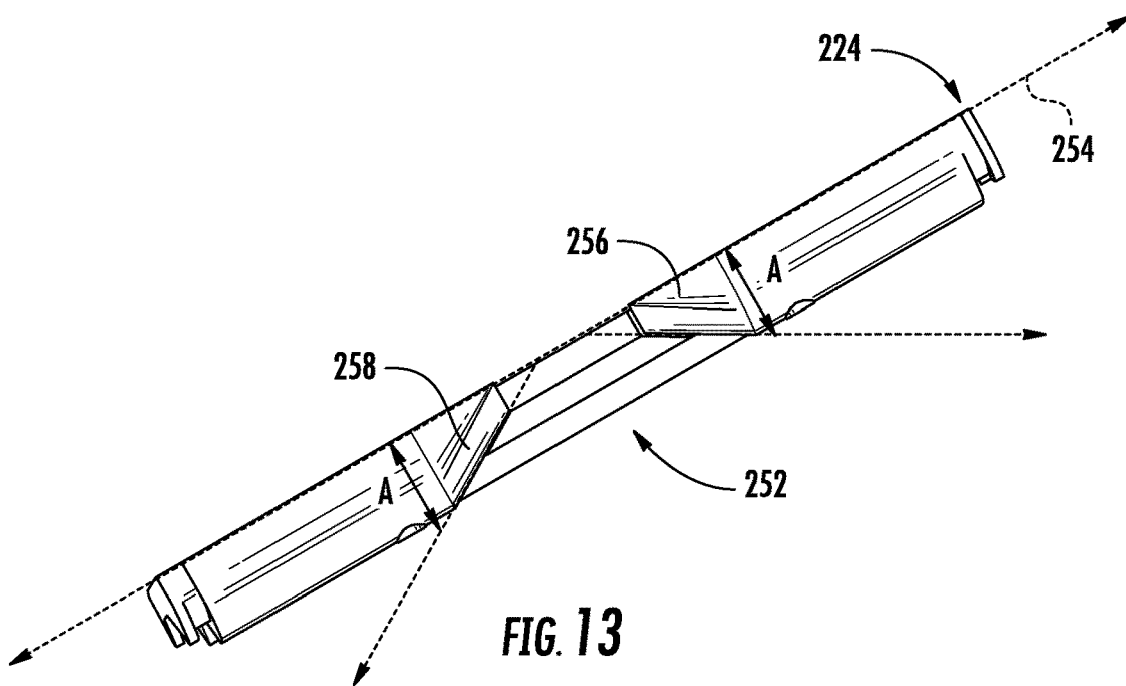
FIG. 13 is a top view of the body segment of FIG. 11, according to an exemplary embodiment.

Referring to FIG. 13, the angled or tapered outer surface of body segment 224 is shown and described in more detail. It should be understood that surfaces of body segments 220 and 228 include surfaces having the tapered shape, angle ranges, etc. as discussed herein. Tapered surface section 252 includes opposing tapered surfaces 256 and 258 which are positioned at angles A relative to medial level axis (or length axis) 254. In various embodiments, angle A is between 15 degrees and 80 degrees, and more specifically between 30 degrees and 60 degrees. The angled surface(s) around level vial 214 are shaped such that the distance from medial axis 254 to outer surfaces 256 and 258 decrease as the distance toward the level vial 214 decreases. In addition to the angled or tapered shape, surfaces 256 and 258 are curved surfaces having a vertically oriented curvature concentric with the curvature of engagement surfaces 240 (shown in FIG. 11). As noted above, this shaping of the region of surface around vial 214 limits the ability of dirt, debris, etc. to become lodged in this area and also allows better access for debris removal.

In addition to the gradually sloped angle of surfaces 256 and 258, surfaces 256 and 258 are sized relative to vials 214 to provide open recessed area shown in the FIGS. In specific embodiments, surfaces 256 and 258 each have a length (in a direction parallel to medial axis 254) that is at least 50% of the length of vial 214, and specifically between 50% and 200% of the length of vial 214. In various embodiments, the area of the region bounded by the start of the tapered section is at least 2 times as large as the area of the vial opening at the center of body segment 224. In various embodiments, angled surfaces 256 and 258 are symmetric around at least one of the long axis and/or short axis of vial 214.

Figure 14:
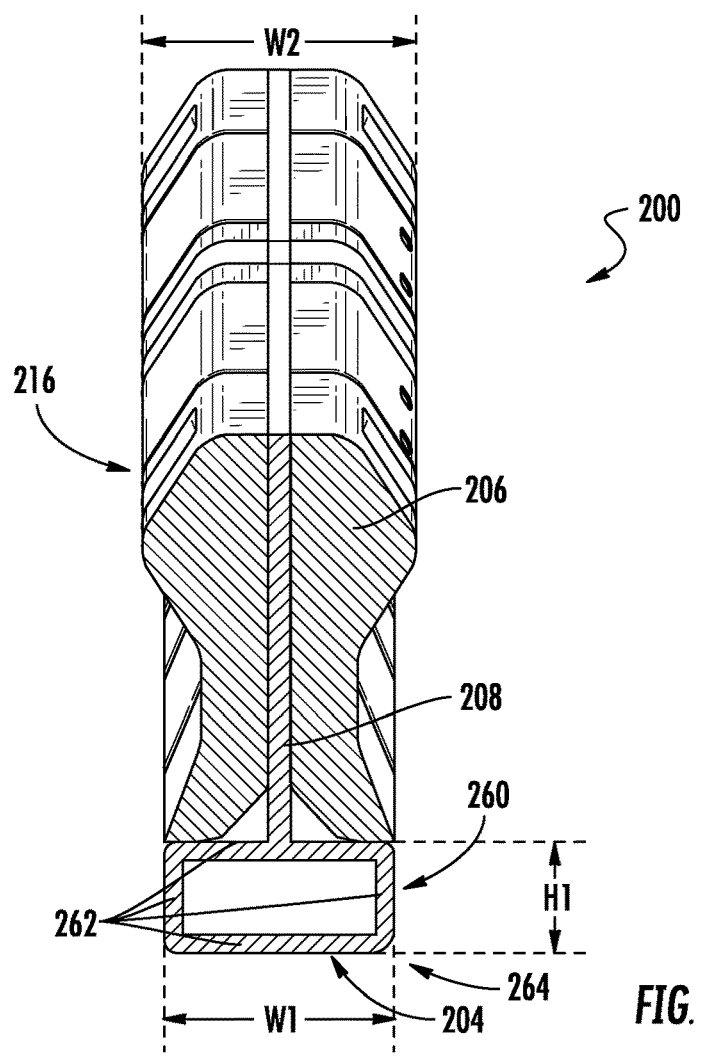
FIG. 14 is an end view of the level of FIG. 9 with end cap removed, according to an exemplary embodiment.

Referring to FIG. 14, the cross-sectional shape (taken perpendicular to the medial axis 254) of outer body 206 and frame 202 are shown in more detail. Outer body 206 includes an enlarged upper section 216 forming a grip along the upper edge of level 200. In addition, frame 202 includes a base structure 260 located on the opposite side (in the vertical direction) of level frame 202 from grip section 216. Base structure 260 is a hollow tubular structure having a plurality of walls 262 having inner surfaces that define a central channel and an outer horizontal surface that defines base surface 204. Central wall 208 extends upward, away from and perpendicular to an upper wall 262. Base structure 260 defines at least one outer rounded corner 264, similar to rounded corner 170 discussed above.

In general, central wall 208 of frame 202 provides a strong, rigid metal support for level vials 214 and the plastic outer body 206 while also conserving the amount of metal (e.g., compared to typical box level frame) used in the level. The hollow box configuration of base structure 260 provides a strong, bend and deformation resistant base (as compared to the flange of a typical I-beam level) which helps ensure the levelness/plumbness of base surface 204 throughout the product life. Further, the hollow box configuration provides a strong, reinforced structure for the lower section of level 200 facilitating use of base structure 260 as a scribing and/or scraping tool. Base structure 260 provides one or more of these functions to level 200 while at the same time providing a relatively light-weight level frame through the hollow structure provided by base structure 260.

In specific embodiments, base structure 260 has a width, W1, and a height, H1. In general, base structure 260 is sized and shaped relative to frame 202 and/or level 200 to provide the various function discussed herein. In specific embodiments, W1 is between 2 times and 10 times the width of central wall 208. In a specific embodiment, W1 is substantially the same as (e.g., within plus or minus 10% of) the maximum width, W2, of outer body 206. In various embodiments, H1 is between 5% and 30% of the total height of level frame 202.

Figure 15:
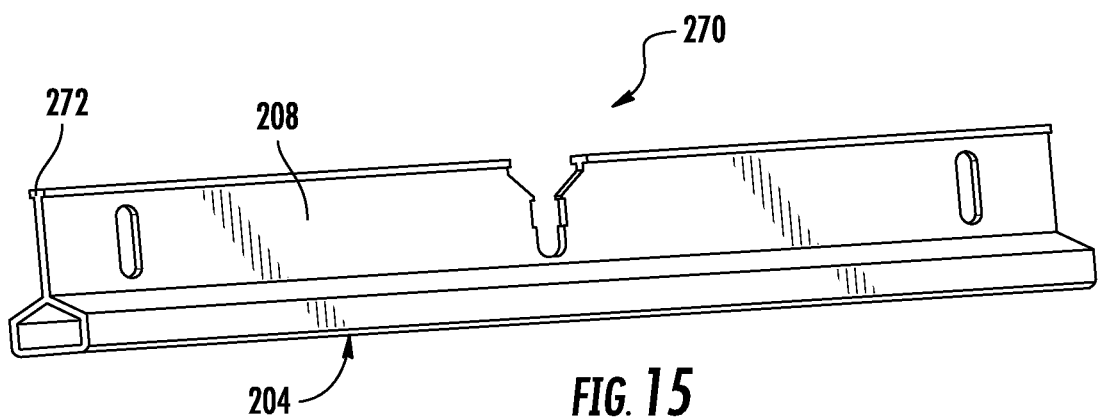
FIG. 15 is a perspective view of a level frame, according to another exemplary embodiment.
Figure 16:
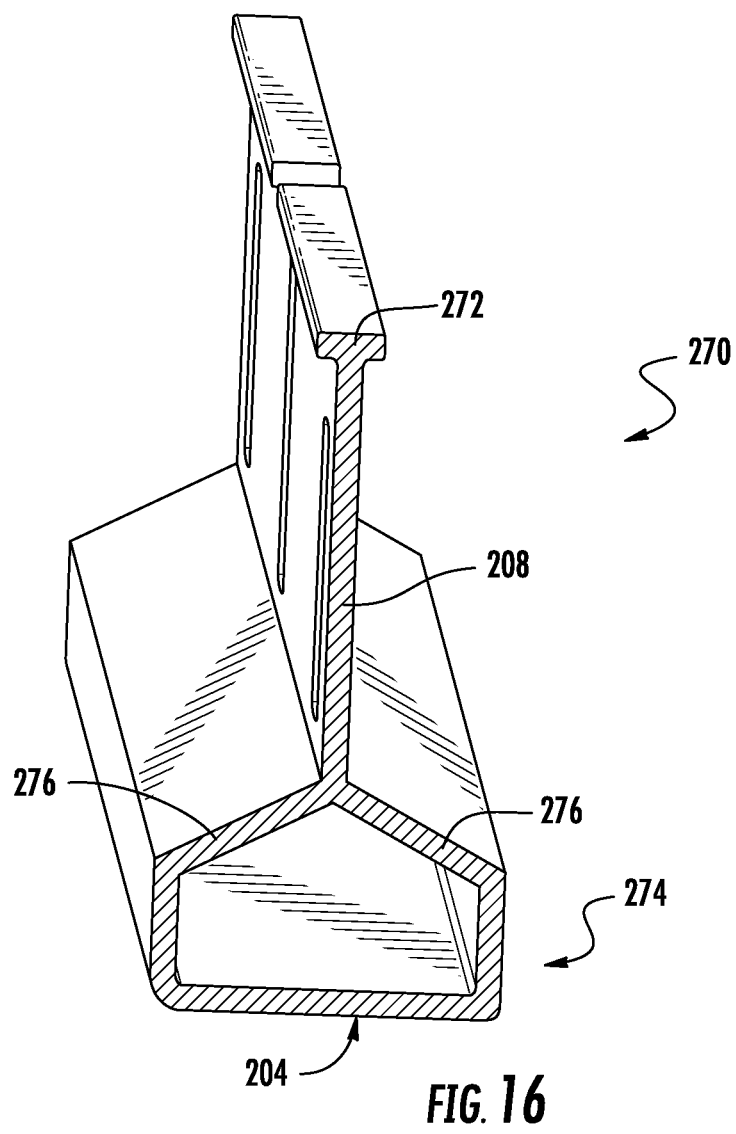
FIG. 16 is an end view of the level frame of FIG. 15, according to another exemplary embodiment.

Referring to FIGS. 15 and 16, a level frame 270 is shown according to an exemplary embodiment. Level frame 270 is substantially the same as frame 202, except as discussed herein. In various embodiments, level 200 includes level frame 270 in place of level frame 202.

Level frame 270 includes a cross-beam 272 located at the upper end of central wall 208. Cross-beam 272 extends horizontally outward from the upper end of central wall 208 providing structural support to frame 270. In addition, an upper flange or cross-beam 272 provides additional surfaces to which body segments 220, 222, 224, 226 and 228 may be attached.

Level frame 270 includes a five-walled base structure 274. Base structure 274 includes two angled upper walls 276. Upper walls 276 angle upward toward central wall 208 and away from base surface 204. In various embodiments, as compared to a horizontal upper wall, angled upper walls 276 allow for the height of center wall 208 to be reduced while maintaining the overall height of level frame 270, which is believed to increase the overall strength of base structure 274 and of level frame 270 while maintaining total level height. Further, this angled shape allows for the height of center wall 208 to be reduced while allowing the height of the outer, lateral surfaces of the body sections to have the desired height as shown (e.g., to have the desired amount of frame 270 covered by the polymer body sections).

Figure 17:
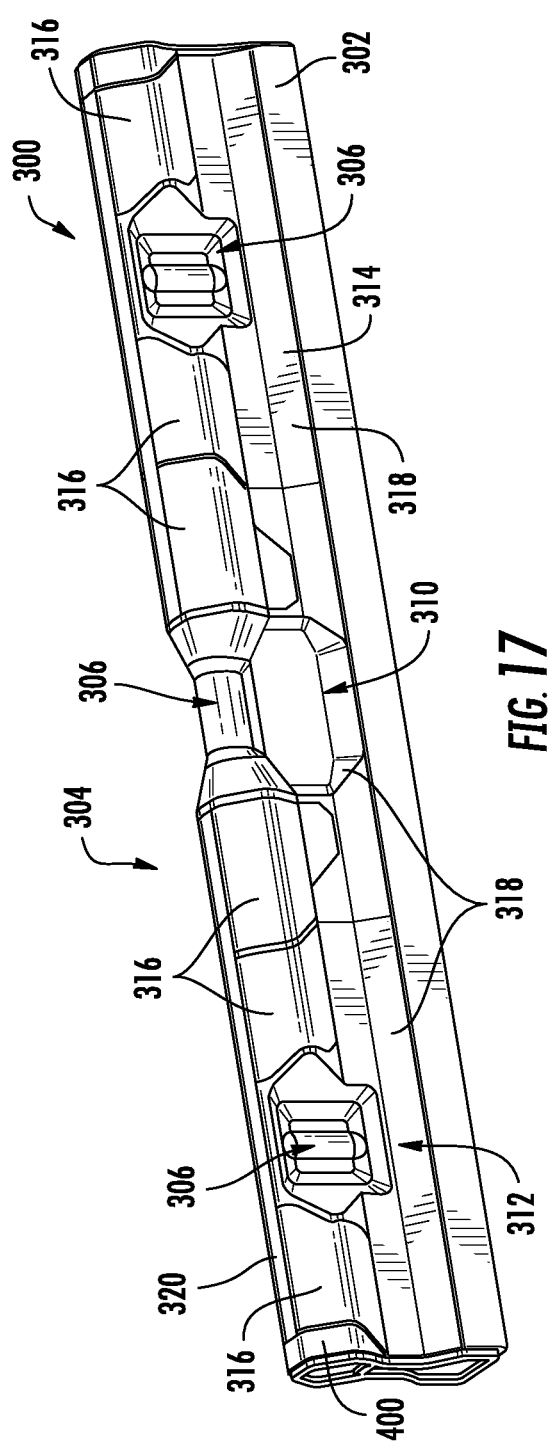
FIG. 17 is a perspective view of a level, according to another exemplary embodiment.

Referring to FIG. 17, a level 300 is shown according to an exemplary embodiment. Level 300 is substantially the same as level 200 except as discussed herein. Similar to level 200, level 300 includes a frame 302. In general, frame 302 is a metal frame that supports various components of level 300 discussed herein, and in various embodiments, frame 302 is formed from an extruded metal material, such as an extruded magnesium metal alloy material, an extruded aluminum alloy material, etc.

Level 300 includes an outer body 304 surrounding and coupled to frame 302 and a plurality of level vials 306 supported by and coupled to outer body 304 and frame 302. In specific embodiments, one or more of level vials 306 may be a gradient vial that provides a number of lines, each correlated to an amount of tilt off of level. In the embodiment shown and similar to the body segments of level 200, outer body 304 includes a plurality of individual body segments, shown as central body segment 310, left end segment 312 and right end segment 314. In general, body segments 310, 312 and 314 are generally shaped and coupled to frame 302 in the same manner as the segments of outer body 206 discussed above.

Body segments 310, 312 and 314 each include one or more grip section 316 supported by a rigid support section 318. In general, grip sections 316 are formed from a polymer material that is different than the rigid material of support sections 318. In general, support sections 318 are formed from a relatively rigid and strong polymer material that is coupled to frame 302 via fasteners as discussed above. In such embodiments, the rigid polymer material of sections 318 includes one or more inner surface (see FIG. 20) that contacts and engages the metal material of frame 302.

Grip sections 316 are coupled to or mounted to a portion of the outer surface of support sections 318. In this manner, the outermost or exterior surface of body segments 310, 312 and 314 are defined in part by the material of support sections 318 and in part by the material of grip sections 316, and in this arrangement, the outer surfaces of grip sections 316 defines a portion of the exterior surface of level 300. In general, the material of grip sections 316 is different from the material of support sections 318 to provide improved gripping/friction along the expanded upper portion of level 300.

In various embodiments, grip sections 316 are made from an overmolded or co-extruded grip material such as a soft touch material, a TPE, a TPU, a thermoplastic material, etc. In such embodiments, the outer surface of grip sections 316 has a higher coefficient of friction than that of the material of support sections 318. In various embodiments, the material of grip sections 316 has a lower durometer than the durometer of the material of support sections 318. In various embodiments, the material of grip sections 316 has a lower modulus of elasticity than the modulus of elasticity of the material of support sections 318. Applicant has found that by combining a grip material with the rigid material of support sections, a unique combination of properties, such as improved gripping, improved durability in a dirty construction environment, and improved assembly and vial alignment are provided.

Figure 18:
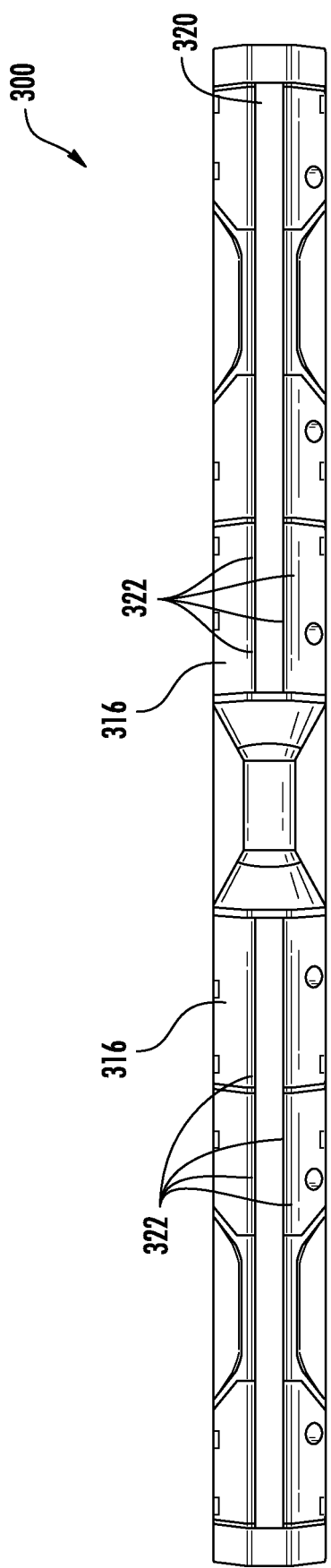
FIG. 18 is a top plan view of the level of FIG. 17, according to an exemplary embodiment.

In addition to the material characteristics, grip sections 316 are located along body segments 310, 312 and 314 in a manner that provides improved gripping while maintaining the structural rigidity of the outer level body 304. Referring to FIG. 17, grip sections 316 of body sections 312 and 314 generally extend downward toward the planar base surface 305 along less than one half of the height of body support sections 318. Similarly, as shown in FIG. 18, grip sections 316 are positioned to curve over toward the upper horizontal surface 320 and central wall 342 of frame 302. In this arrangement grip sections 316 each have a horizontal surface 322 (e.g., generally upward facing surface in the orientation of FIG. 17) that extends along and general parallel to horizontal surface 320 of frame 302. Similarly, as shown best in FIG. 18, grip sections 316 occupy a significant portion of the length of level 300. As shown in FIG. 18, the total longitudinal length of horizontal surfaces 322 of all grip sections 316 is at least 40%, specifically at least 50% and more specifically at least 60% of the total axial length of upper horizontal frame surface 320. In addition, a substantial portion of the area of all outer surfaces of level 300 is occupied by the grip material of grip sections 316. In various embodiments, grip sections 316 account for between 5% and 75% of the total outer surface area of level 300, specifically, grip sections 316 account for between 10% and 50% of the total outer surface area of level 300, and more specifically, grip sections 316 account for between 15% and 40% of the total outer surface area of level 300. Applicant has found that gripping provided by grip sections 316 may be improved by providing gripping surfaces that surround a substantial portion of the upper expanded section of the level body 304 and that occupies a substantial portion of the length or surface area of level 300.

Figure 19:
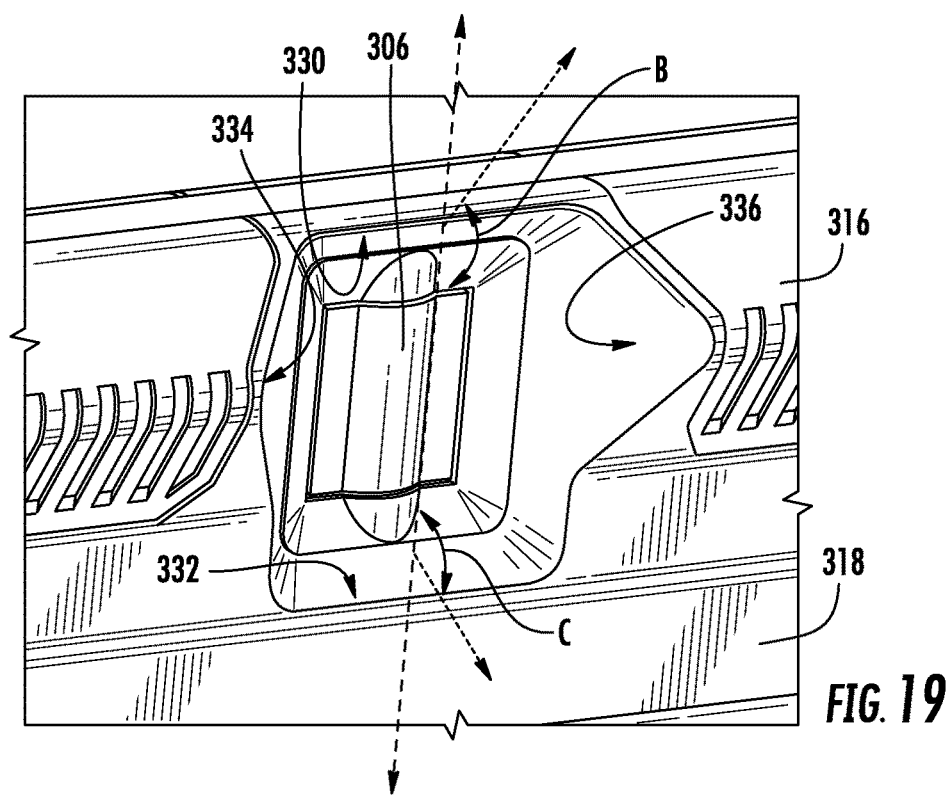
FIG. 19 is a detailed perspective view of a vial area of the level of FIG. 17, according to an exemplary embodiment.
Figure 20:
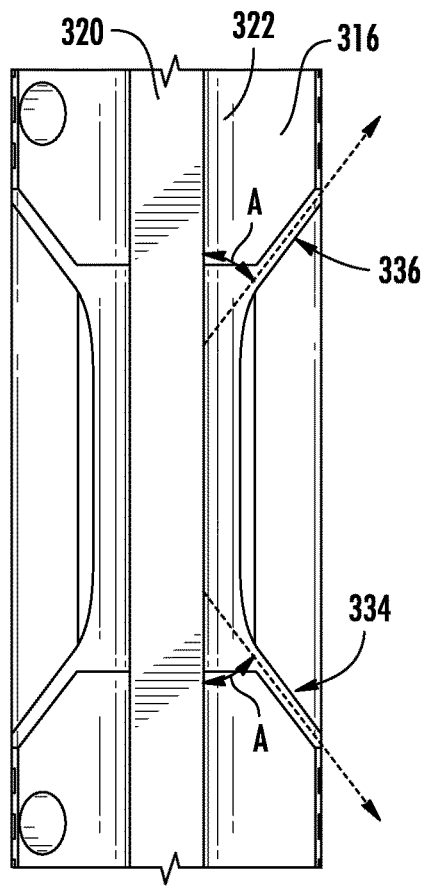
FIG. 20 is a detailed top plan view of the vial area of the level of FIG. 19, according to an exemplary embodiment.

Referring to FIGS. 19 and 20, similar to the shape of the body portions that surround the vials of level 200, the sections of body support portions 318 surrounding level vials 306 are shaped to provide improved viewability and improved access for cleaning of debris from the area around vials 306. As shown in FIG. 19, the rigid material of body support portion 318 completely surrounds at least one vial 306 along the lateral face of level 300 such that the softer material of grip sections is spaced from level vial 306. In this embodiment, the rigid material of the body section surrounds and provides structural stability and protection to level vials 306. It should be understood that, while one of the vials 306 is shown in FIG. 19, level 300 may include two or more areas surrounding level vials 306 as shown in FIG. 19.

To provide improved viewability and access for cleaning/ debris removal, the surfaces of body support portions 318 surrounding level vial 306 are angled and slope inward from the outermost surfaces of level body 304 toward level vial 306. In some such arrangements, these angled surfaces are located on each side (e.g., above, below, left and right) of level vial 306 and, in specific embodiments, the angled surfaces completely surround level vial 306. As shown in FIG. 19, the angled surfaces surrounding level vial 306 are inwardly angled such that the width dimension (e.g., the outer width measured at the outer surface of body support portion 318) of level 300 decreases in a direction toward level vial 306, and in embodiments where the tapered surfaces completely surround level vial 306, this decrease in width dimension occurs on all sides of level vial 306.

As shown best in FIG. 19, body support section 318 includes an upper angled surface 330 and a lower angled surface 332. Upper angled surfaces 330 and lower angled surface 332 have longitudinal axes that are substantially parallel to the longitudinal axis of level 300. In addition, upper angled surface 330 is defined by an angle B relative to a vertical axis and lower angled surface 332 is defined by an angle C relative to a vertical axis. In various embodiments, angle B and angle C are between 100 degrees and 170 degrees and specifically between 120 degrees and 150 degrees. In some embodiments, angle B and C are the same as each other and in other embodiments, angle B and C are different from each other.

Similar to level 200 discussed above, body support section 318 also includes a left (in the orientation of FIG. 19) lateral angled surface 334 and a right (in the orientation of FIG. 19) angled surface 336. In this arrangement, angled surfaces 334 and 336 extend in a generally vertical direction between upper angled surface 330 and lower angled surface 332, such that the angled surfaces 330, 332, 334 and 336 surround level vial 306. Similar to level 200, angled surfaces 334 and 336 are defined by angles A as shown in FIG. 20 and discussed above. In this arrangement, angled surfaces 330, 332, 334 and 336 can be seen as framing level vial 306 defining an area of gradual transition from the maximum outer width dimensions of level body 304 located outside of angled surfaces 330, 332, 334 and 336 to the minimum outer width dimension located at the opening within which level vial 306 is mounted. It should also be understood that while angled surfaces 330, 332, 334 and 336 are shown and described as planar tapered surfaces, in other embodiments, the general decrease in outer width dimension provided by surfaces 330, 332, 334 and 336 can be provided by a curved surface that angles or tapers to provide the transition to the body width at level vial 306 as discussed above.

Figure 21:
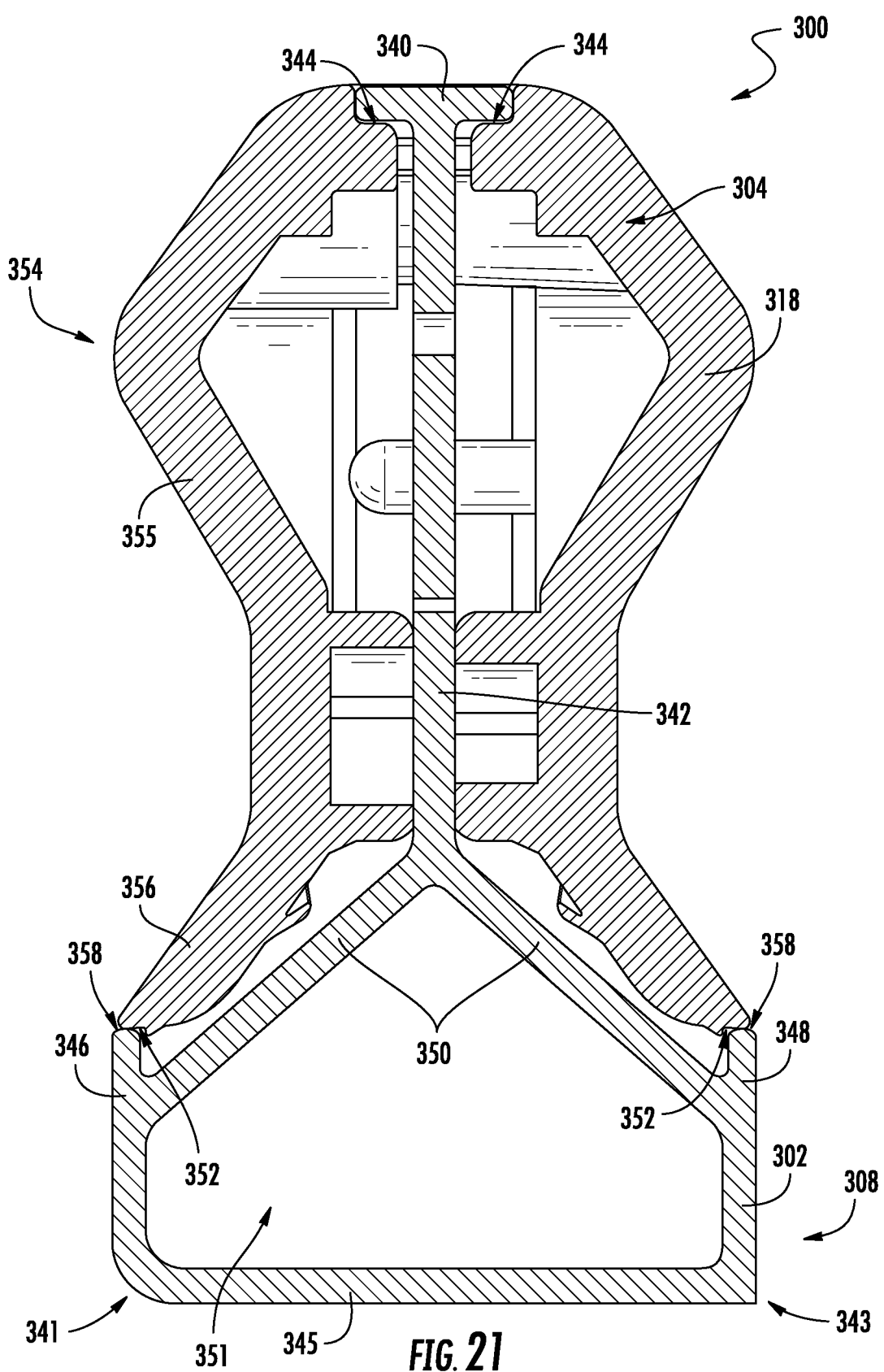
FIG. 21 is an end cross-sectional view of the level of FIG. 17, according to an exemplary embodiment.

Referring to FIG. 21, a cross-sectional view of level 300 showing body support sections 318 coupled to level frame 302 is shown in more detail. Similar to the discussion above regarding level 200, outer body 304 and body support sections 318 are generally coupled to frame 302 via post and fasteners. However, in addition to coupling and supporting outer body 304 from frame 302, level 300 is configured to provide a tight fit or seal between outer body 304 and frame 302 which limits or prevents dirt and debris from entering the internal spaces between outer body 304 and frame 302.

To provide this engagement/sealing, frame 302 includes an upper flange 340 extending perpendicular and in a generally horizontal direction outward from a vertical central web or wall 342. As shown in FIG. 21, the upper section of body portions 318 include opposing L-shaped surfaces 344 that are sized to abut and seal against the outer surfaces of upper frame flange 340. Each body support section 318 is sized to provide a tight friction fit or a snap fit between L-shaped surfaces 344 and upper flange 340 such that the seam at the interface between these two components is sealed enough to prevent substantial debris, dust, dirt, etc. from entering into level 300. In a specific embodiment, the fit between L-shaped surfaces 344 and upper flange 340 is sufficient to prevent solid debris from entering level 300, but does not form a liquid-tight or air-tight seal.

In addition to sealing along the upper interface between frame 302 and outer body 304, frame 302 includes a base structure 308 that is similar to base structure 260. Base structure 308 includes a pair of sidewalls, shown as a first vertical wall 346 and a second vertical wall 348. Walls 346 and 348 extend upward from lateral edges of bottom wall 345 defining a first corner edge 341 and second corner edge 343. Similar to level 100 discussed above, first corner edge 341 is a rounded corner having a relatively large radius of curvature that is at least twice the radius of curvature of second corner edge 343.

Similar to the frame of level 200, frame 302 includes a pair of opposed angled walls 350 angled inwardly from walls 346 and 348 to join base structure 308 to a lower end of central wall 342. As can be seen in FIG. 21, inner surfaces of bottom wall 345, vertical walls 346 and 348, and angled walls 350 define a cavity 351, and cavity 351 is an open area that extends between opposing first and second ends of the level frame 302. As can be seen in the exemplary embodiment of FIG. 21, the uppermost surface defined by flange 340 and the planar base surface of bottom wall 345 are parallel to each other, and central wall 342 is perpendicular to the upper surface and to the planar base surface and bisects the planes defined by both the upper surface and the planar base surface. In addition, the width of the upper surface is less than a width of the planar base surface. Applicant has found that this frame structure provides both sufficient rigidity to level 300 while also allowing outer body 304 to be firmly and securely mounted to level frame 302.

First vertical wall 346 and second vertical wall 348 each provides a lower sealing location between frame 302 and the lower edge of outer body 304. First and second vertical walls 346 and 348 extend vertically upward from and past the lower end of each angled walls 350. The lower end of each body support section 318 defines an L-shaped surface 352 that is sized to abut and seal against the outer surfaces of vertical walls 346 and 348. Each body support section 318 is sized to provide a tight friction fit or a snap fit between L-shaped surfaces 352 and vertical walls 346 and 348 such that the seam at the interface between these two components is sealed enough to prevent substantial debris, dust, dirt, etc. from entering into level 300. In a specific embodiment, the fit between L-shaped surfaces 352 and vertical walls 346 and 348 is sufficient to prevent solid debris from entering level 300, but does not form a liquid-tight or air-tight seal.

In addition to providing a surface against which to seal outer body 304, flange 340 provides downwardly facing and outwardly facing support surfaces, and vertical walls 346 and 348 provide both an upward facing and an inwardly facing support surfaces. These support surfaces provide surfaces against which outer body 304 is supported when fastened to frame 302. In specific embodiments, outer body 304 is supported and coupled to frame 302 at least in part by a snap-fit or friction fit between the L-shaped surfaces of outer body 304 and the opposing surfaces of frame 302. Support in this manner provides the polymer material of outer body 304 with a tight, stable fit to frame 302 which is believed to provide a solid, integral feel to level body 304 despite being formed from multiple polymer pieces coupled to frame 302.

In addition to providing sealing, outer body 304 is shaped to provide an easy to grip and easy to handle structure. Outer body 304 includes an enlarged upper section 354 that defines a maximum width of outer body 304 that is located at a vertical position between a vertical mid-point of central wall 342 and the upper flange 340. Outer body 304 includes an inwardly extending central section 355 that extends inward toward central wall 342 and is located below the enlarged upper grip section 354. Outer body 304 includes an outwardly extending lower section 356 that extends outward toward the upward facing surfaces 358 located at the upper ends of vertical walls 346 and 348. As can be seen in the specific embodiments of FIGS. 17 and 21, grip sections 316 define at least a portion of the outer surface of the enlarged upper portion 354, and support sections 318 are formed from contiguous pieces of plastic material such that enlarged upper portion 354, inwardly extending central section 355 and the outwardly extending lower section 356 are all part of the same contiguous piece of plastic material.

Figure 22:
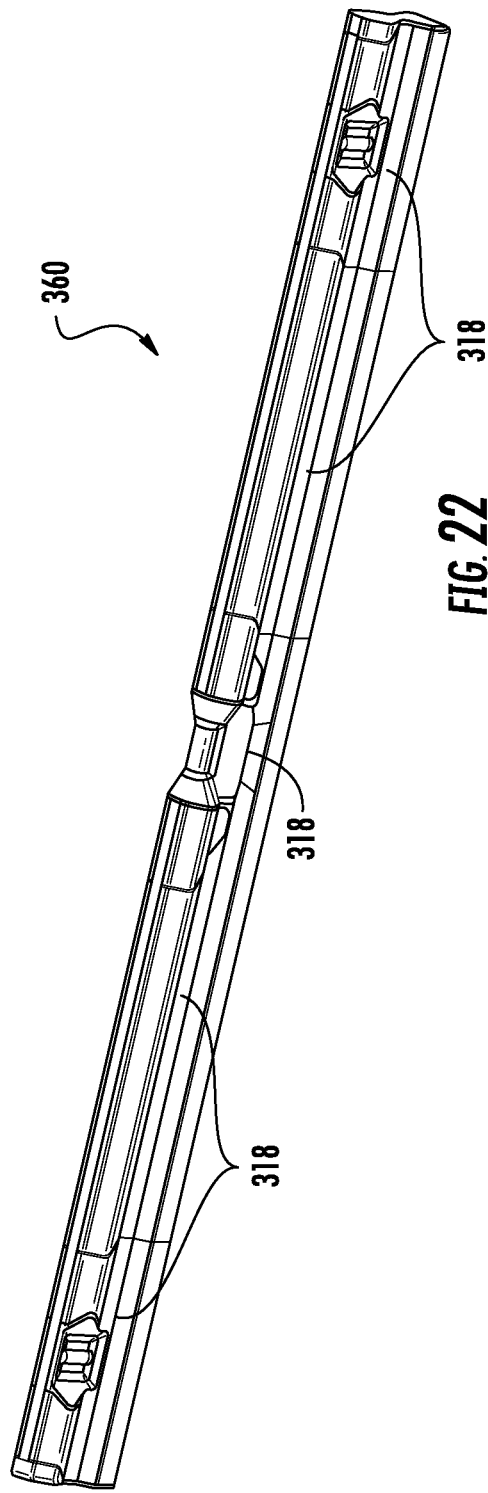
FIG. 22 is a perspective view of a level, according to another exemplary embodiment.
Figure 23:
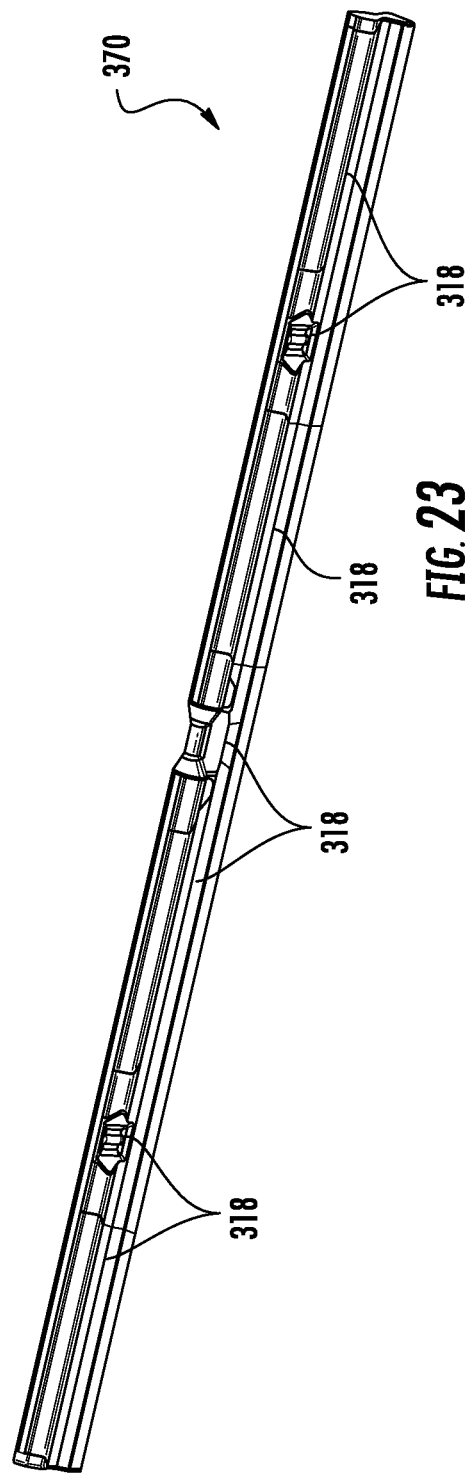
FIG. 23 is a perspective view of a level, according to another exemplary embodiment.

Referring to FIG. 22 and FIG. 23, levels 360 and 370 are shown according to exemplary embodiments. Levels 360 and 370 are substantially the same as level 300, except that levels 360 and 370 have a longer longitudinal length than level 300, and accordingly, include additional body support sections 318. As shown in FIG. 17, level 300 is a relatively short level and has three body support sections 318 located along each side of frame 302, and in a specific embodiment, level 300 has a total longitudinal length of about 24 inches. As shown in FIG. 22, level 360 is a mid-sized level and has five body support sections 318 located along each side of frame 302, and in a specific embodiment, level 360 has a total longitudinal length of 48 inches. As shown in FIG. 23, level 370 is a large level and has seven body support sections 318 located along each side of frame 302, and in a specific embodiment, level 370 has a total longitudinal length of 72 inches.

Figure 24:
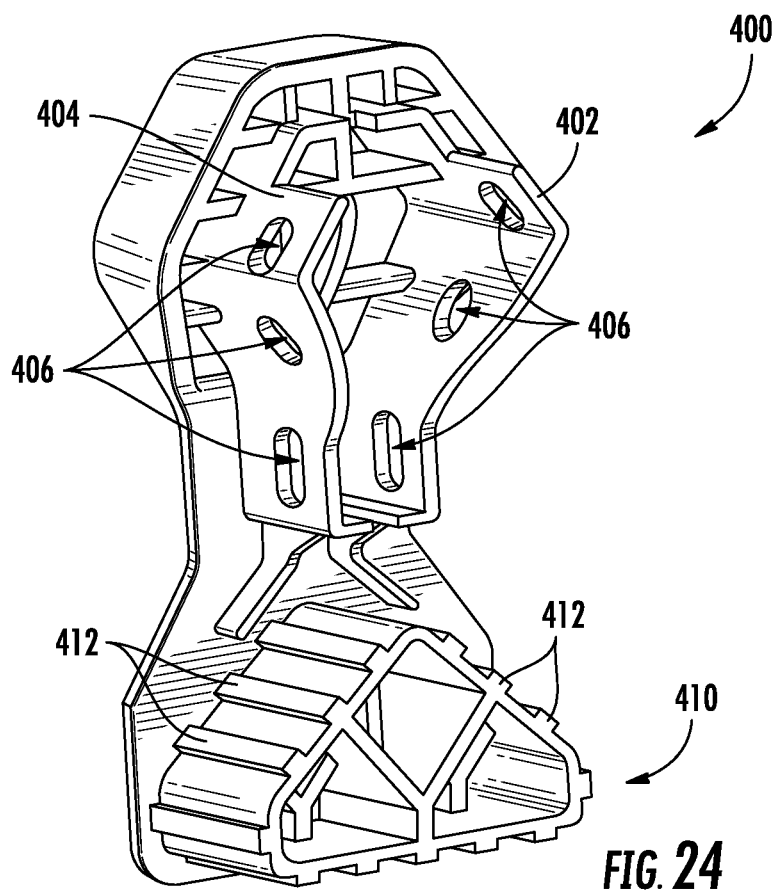
FIG. 24 is a perspective view of an end cap for a level, according to an exemplary embodiment.
Figure 25:
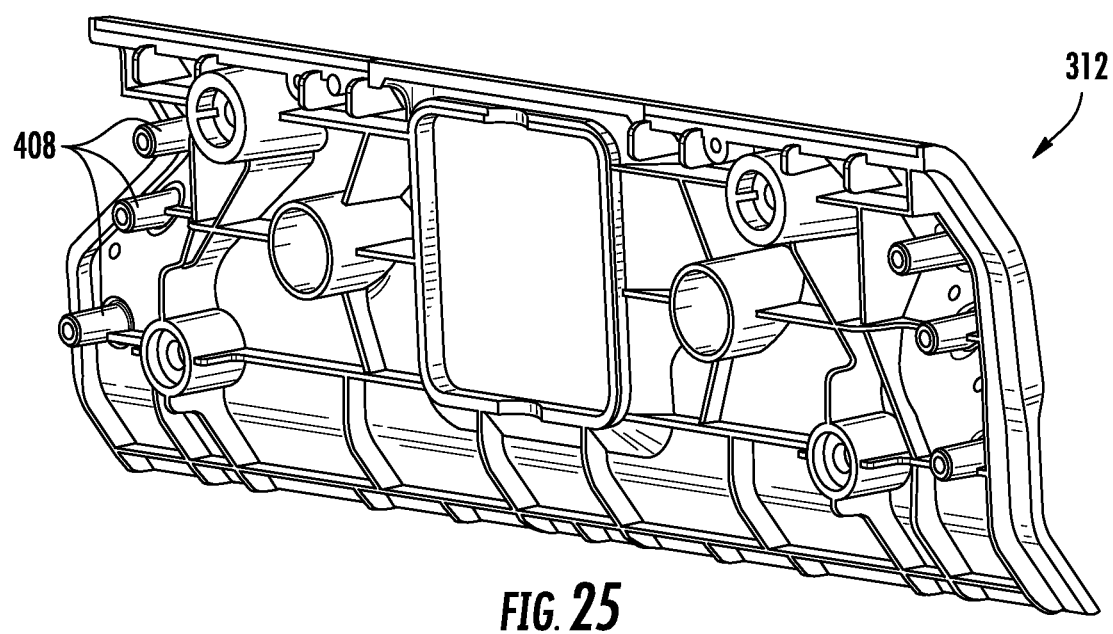
FIG. 25 is a perspective view of an inner surface of a level body segment, according to an exemplary embodiment.
Figure 26:
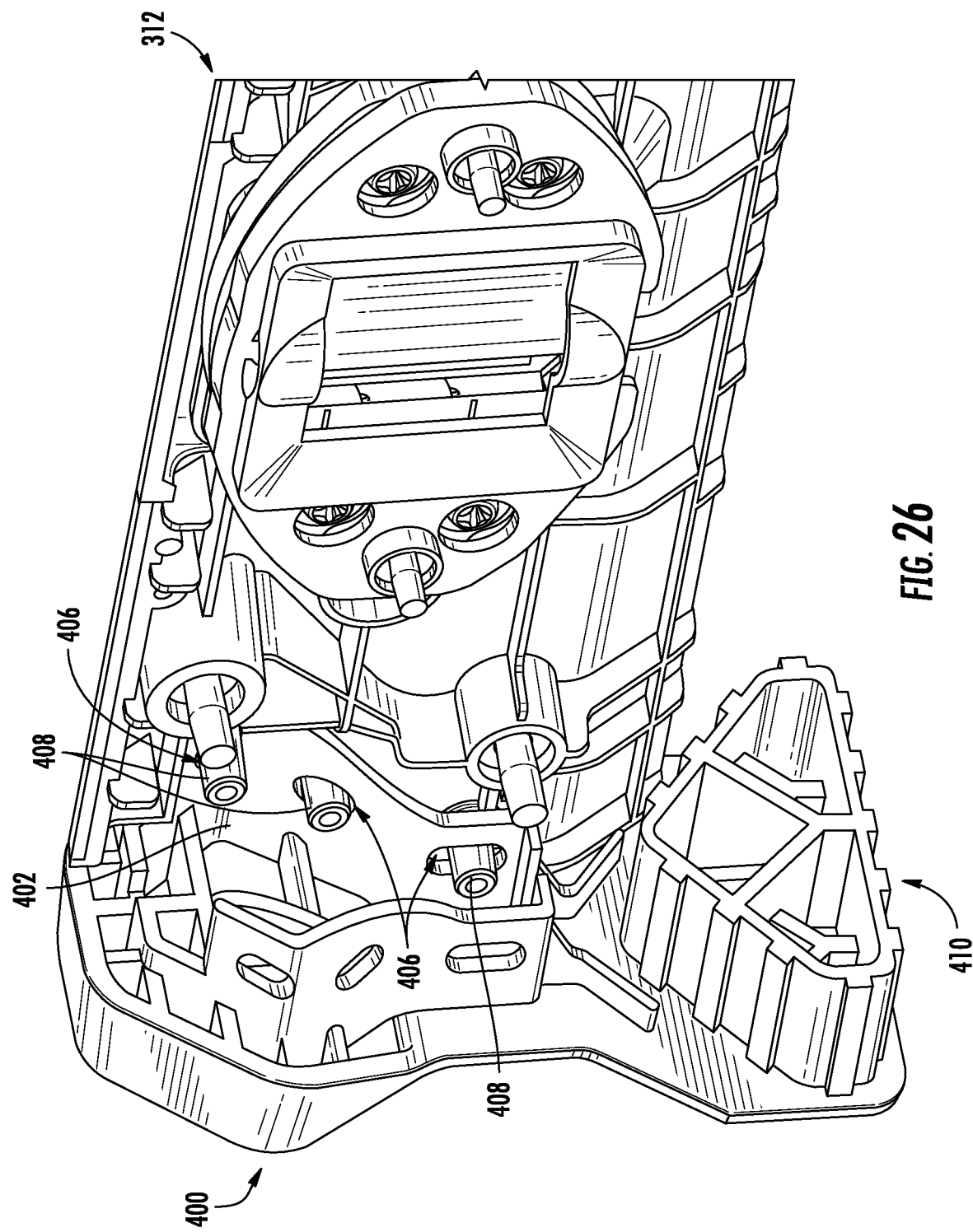
FIG. 26 is a perspective view showing retention/engagement between the end cap of FIG. 24 and the body segment of FIG. 25, according to an exemplary embodiment.

Referring to FIGS. 24-26, an end cap 400 for use with the levels discussed herein is shown and described. In general, as shown in FIG. 17, an end cap 400 is located at each of the opposing ends of level frame 302 and seals the ends of the internal cavities within level 300. As shown in FIGS. 24-26, end cap 400 is configured for mounting to both the metal frame 302 and the plastic level body 304.

End cap 400 includes a pair of internal walls 402 and 404 that extend inward in a direction that is substantially parallel to the longitudinal axis of level 300 when the end cap is mounted to seal the ends of level 300. In general, internal walls 402 and 404 are shaped to match the contours of the outer surface of the body sections to which they are attached. Each internal wall 402 and 404 includes a plurality of openings 406 that receive posts 408 that are located along the inner surfaces of left end body segments 312 and of right end body segments 314. The engagement between posts 408 and openings 406 acts to hold end cap 400 in place when mounted to outer level body 304. It should be understood that while one side of left end body segment 312 is shown in FIGS. 25 and 26, the inner surfaces of right end body segments 314 are mirror images of left end body segment 312.

In addition to being coupled to outer body 304, end cap 400 includes post 410 that is shaped to be received within cavity 351 defined within level frame 302. In general, post 410 may be sized and/or include projections 412 the form a friction fit with the inner surfaces of the walls that define cavity 351. Thus, in such embodiments, end cap 400 is configured with both a first structure (e.g., an upper structure) that engages and/or couples to the plastic material and a second structure (e.g., a lower structure) that engages and/or couples to the metal material of frame 302.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended to include one or more component or element, and is not intended to be construed as meaning only one.

Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. In addition, in various embodiments, the present disclosure extends to a variety of ranges (e.g., plus or minus 30%, 20%, or 10%) around any of the absolute or relative dimensions disclosed herein or determinable from the Figures.

What is claimed is:

1. A level comprising:
    a level frame formed from a metal material, the level frame comprising:
        a planar base surface;
        a vertical wall extending away from the planar base surface;
        a vial opening defined at least in part within the vertical wall; and
        a longitudinal axis extending between opposing ends of the level frame;
    a level vial supported by the level frame within the vial opening; and
    a plastic outer level body coupled to the level frame, the outer level body comprising:
        a first pair of plastic body segments coupled to and positioned on opposite sides of the vertical wall of the level frame such that the first pair of plastic body segments define part of an exterior surface of the level; and
        a second pair of plastic body segments coupled to and positioned on opposite sides of the vertical wall of the level frame such that the second pair of plastic body segments define part of the exterior surface of the level.

2. The level of claim 1, wherein outer surfaces of the plastic outer level body define at least 50% of a total area of an exterior surface of the level.

3. The level of claim 1, wherein a longitudinal length of the plastic outer level body is at least 90% of a longitudinal length of the level frame.

4. The level of claim 1, wherein a height of the plastic outer level body is at least 50% of a height of the level frame.

5. The level of claim 1, wherein the level frame is formed from a single, integral piece of magnesium metal material.

6. The level of claim 1, wherein the first and second pairs of plastic body segments each further comprise:
    a first plastic material that interfaces with the level frame to couple the body segment to the level frame; and
    a second plastic material defining a grip portion of an outer surface of the body segment, wherein the second plastic material has a durometer that is less than a durometer of the first plastic material.

7. The level of claim 1, wherein the first pair of plastic body segments are located on opposite sides of the vertical wall at least partially surrounding the vial opening, wherein each body segment of the first pair of plastic body segments includes a curved surface that engages an outer surface of the level vial.

8. A level comprising:
    a level frame formed from a metal material, the level frame comprising:
        a base structure including a plurality of walls each having an inner surface together defining a central channel, and an outer horizontal surface defining a planar base surface;
        a central vertical wall coupled to the base structure and extending away from the base surface;
        a vial opening defined at least in part within the vertical wall; and
        a longitudinal axis extending between opposing ends of the level frame;
    a level vial supported by the level frame within the vial opening; and
    a plastic outer level body coupled to the level frame, the outer level body comprising:
        a first pair of plastic body segments coupled to and positioned on opposite sides of the vertical wall of the level frame such that the first pair of plastic body segments define part of an exterior surface of the level; and
        a second pair of plastic body segments coupled to and positioned on opposite sides of the vertical wall of the level frame such that the second pair of plastic body segments define part of the exterior surface of the level.

9. The level of claim 8, wherein the base structure is a hollow tubular structure.

10. The level of claim 8, wherein a width of the base structure is between 2 times and 10 times a width of the central vertical wall.

11. The level of claim 8, wherein a height of the base structure is between 5% and 30% of a total height of the level frame.

12. The level of claim 8, wherein opposing inner surfaces of the plastic body segments engage the level vial to hold the level vial in a horizontal position relative to the base surface.

13. The level of claim 8, wherein the level frame includes a cross-beam located at an upper end of the central wall extending horizontally outward from the upper end of the central wall to support the level frame.

14. A level comprising:
    a level frame formed from a metal material, the level frame comprising:
        a planar base surface;
        a vertical wall extending away from the planar base surface;
        a vial opening defined at least in part within the vertical wall; and
        a longitudinal axis extending between opposing ends of the level frame;
    a level vial supported by the level frame within the vial opening; and
    a plastic outer level body coupled to the level frame, the outer level body comprising:
        a pair of opposing left end body segments;
        a pair of opposing right end body segments; and
        a pair of opposing central body segments; and
    a pair of end cap structures, wherein each end cap structure is coupled to the level frame to seal one of the opposing ends of the level frame.

15. The level of claim 14, wherein the level frame further comprises an upper planar surface, wherein a width of the upper planar surface is less than a width of the planar base surface.

16. The level of claim 14, wherein each body segment includes at least one grip section supported by a rigid support section.

17. The level of claim 16, wherein each grip section is formed from a material having a lower modulus of elasticity than a material of each rigid support section.

18. The level of claim 16, wherein the grip sections of the opposing left end body sections and the grip sections of the opposing right end body sections each extend downward toward the planar base surface along less than one half a height of the respective rigid support section.

19. The level of claim 14, wherein the end cap structures each comprise a pair of internal walls including a plurality of openings that receive posts located along a respective inner surface of the left end body segment and the right end body segment.

20. The level of claim 19, wherein each end cap structure comprises an upper structure engaging the plastic outer level body and a lower structure engaging the metal material of the level frame.

* * * * *